United States Patent
Shaffer, II et al.

(10) Patent No.: US 12,107,253 B2
(45) Date of Patent: Oct. 1, 2024

(54) ACTIVE MATERIALS USEFUL IN BALANCING POWER AND ENERGY DENSITY OF A BATTERY ASSEMBLY

(71) Applicant: ADVANCED BATTERY CONCEPTS, LLC, Clare, MI (US)

(72) Inventors: Edward O. Shaffer, II, Farwell, MI (US); Maria Penafrancia Roma, Mount Pleasant, MI (US); Reed A. Shick, Midland, MI (US)

(73) Assignee: Advanced Battery Concepts, LLC, Clare, MI (US)

( * ) Notice: Subject to any disclaimer, the term of this patent is extended or adjusted under 35 U.S.C. 154(b) by 0 days.

(21) Appl. No.: 17/294,273

(22) PCT Filed: Nov. 15, 2019

(86) PCT No.: PCT/US2019/061725
§ 371 (c)(1),
(2) Date: May 14, 2021

(87) PCT Pub. No.: WO2020/102677
PCT Pub. Date: May 22, 2020

(65) Prior Publication Data
US 2022/0013760 A1   Jan. 13, 2022

Related U.S. Application Data

(60) Provisional application No. 62/767,919, filed on Nov. 15, 2018.

(51) Int. Cl.
*H01M 4/04* (2006.01)
*H01M 4/02* (2006.01)
*H01M 4/56* (2006.01)

(52) U.S. Cl.
CPC ........... *H01M 4/0478* (2013.01); *H01M 4/56* (2013.01); *H01M 2004/021* (2013.01)

(58) Field of Classification Search
CPC ................. H01M 4/0478; H01M 4/56; H01M 2004/021; H01M 10/0418; H01M 10/044;
(Continued)

(56) References Cited

U.S. PATENT DOCUMENTS

| 414,953 A | 11/1889 | Roberts |
|---|---|---|
| 1,712,897 A | 5/1929 | Morrison |

(Continued)

FOREIGN PATENT DOCUMENTS

| CA | 2560069 A1 | 9/2005 |
|---|---|---|
| CH | 248315 A | 4/1947 |

(Continued)

OTHER PUBLICATIONS

Machine translation of JP H10223211 A (Year: 1998).*
(Continued)

*Primary Examiner* — Matthew T Martin
*Assistant Examiner* — Unique Jenevieve Luna
(74) *Attorney, Agent, or Firm* — The Dobrusin Law Firm, P.C.; Daniela M. Thompson-Walters

(57) ABSTRACT

The present disclosure relates to battery plates which are useful in optimizing the power and energy density of a batter assembly by having discrete active materials. The present disclosure relates to a battery plate having: a) a substrate having a first surface opposing a second surface; b) one or more active materials disposed on the first surface, second surface, or both the first surface and the second surface of the substrate; and wherein the one or more active materials include two or more discrete active material regions.

20 Claims, 8 Drawing Sheets

(58) Field of Classification Search
CPC ... H01M 10/127; H01M 10/18; H01M 10/282
See application file for complete search history.

(56) References Cited

U.S. PATENT DOCUMENTS

| | | | |
|---|---|---|---|
| 3,170,821 A * | 2/1965 | Schenk | H01M 4/762 |
| | | | 429/223 |
| 3,522,104 A | 7/1970 | Biddick | |
| 4,008,099 A | 2/1977 | Lindstrom | |
| 4,098,967 A | 7/1978 | Biddick | |
| 4,510,219 A | 4/1985 | Rowlette | |
| 4,542,082 A | 9/1985 | Rowlette | |
| 4,625,395 A | 12/1986 | Rowlette | |
| 4,637,970 A | 1/1987 | Yeh | |
| 4,658,499 A | 4/1987 | Rowlette | |
| 4,752,545 A | 6/1988 | Brecht | |
| 4,861,686 A | 8/1989 | Snyder | |
| 4,900,643 A | 2/1990 | Eskra | |
| 5,002,841 A | 3/1991 | Belongia | |
| 5,035,045 A | 7/1991 | Bowen | |
| 5,068,160 A | 11/1991 | Clough | |
| 5,114,807 A | 5/1992 | Rowlette | |
| 5,126,218 A * | 6/1992 | Clarke | H01M 4/14 |
| | | | 429/245 |
| 5,143,806 A * | 9/1992 | Bullock | C23C 22/60 |
| | | | 429/228 |
| 5,288,565 A | 2/1994 | Gruenstern | |
| 5,308,717 A | 5/1994 | Gordin | |
| 5,308,718 A | 5/1994 | Eidler et al. | |
| 5,326,656 A | 7/1994 | Meadows | |
| 5,379,502 A | 1/1995 | Feldstein | |
| 5,393,617 A | 2/1995 | Klein | |
| 5,429,643 A | 7/1995 | Lund et al. | |
| 5,441,824 A | 8/1995 | Rippel | |
| 5,470,679 A | 11/1995 | Lund et al. | |
| 5,510,211 A | 4/1996 | Sundberg | |
| 5,582,937 A | 12/1996 | LaFollette | |
| 5,585,209 A | 12/1996 | Feldstein | |
| 5,593,797 A | 1/1997 | Brecht | |
| 5,682,671 A | 11/1997 | Lund | |
| 5,688,615 A | 11/1997 | Mrotek | |
| 5,800,946 A | 9/1998 | Grosvenor | |
| 5,916,709 A | 6/1999 | Arias | |
| 6,017,653 A | 1/2000 | Petrakovich | |
| 6,077,623 A | 6/2000 | Grosvenor | |
| 6,139,987 A | 10/2000 | Koo et al. | |
| 6,159,633 A | 12/2000 | Yang | |
| 6,174,337 B1 | 1/2001 | Keenan | |
| 6,255,015 B1 | 7/2001 | Corrigan et al. | |
| 6,280,879 B1 | 8/2001 | Andersen | |
| 6,555,267 B1 | 4/2003 | Broman | |
| 6,589,298 B1 | 4/2003 | Limoges et al. | |
| 6,889,410 B2 | 5/2005 | Shivashankar et al. | |
| 7,275,130 B2 | 9/2007 | Klein | |
| 8,357,469 B2 | 1/2013 | Shaffer, II et al. | |
| 9,166,231 B2 | 10/2015 | Hoshiba | |
| 9,379,378 B2 | 6/2016 | Ross | |
| 9,553,329 B2 | 1/2017 | Shaffer, II | |
| 9,666,860 B2 | 5/2017 | Lam | |
| 9,685,677 B2 | 6/2017 | Shaffer, II | |
| 9,825,336 B2 | 11/2017 | Shaffer, II | |
| 10,141,598 B2 | 11/2018 | Shaffer, II et al. | |
| 10,615,393 B2 | 4/2020 | Shaffer, II | |
| 2004/0067417 A1 | 4/2004 | Oosawa et al. | |
| 2004/0072074 A1 | 4/2004 | Partington | |
| 2006/0003223 A1 | 1/2006 | Willson | |
| 2006/0263692 A1 | 11/2006 | Kelley et al. | |
| 2006/0269801 A1* | 11/2006 | Honbo | H01M 4/62 |
| | | | 429/7 |
| 2006/0292443 A1 | 12/2006 | Ogg | |
| 2007/0148542 A1 | 6/2007 | Szymborski | |
| 2007/0212604 A1 | 9/2007 | Ovshinsky | |
| 2009/0042099 A1 | 2/2009 | Tatematsu et al. | |
| 2009/0098457 A1 | 4/2009 | Kwon | |
| 2009/0248124 A1 | 10/2009 | Pianca | |
| 2010/0183920 A1 | 7/2010 | Brecht | |
| 2011/0014520 A1 | 1/2011 | Ueda | |
| 2011/0091770 A1 | 4/2011 | Han et al. | |
| 2011/0183166 A1 | 7/2011 | Suga et al. | |
| 2011/0183203 A1 | 7/2011 | Du et al. | |
| 2012/0244429 A1* | 9/2012 | Lam | H01M 4/74 |
| | | | 977/773 |
| 2013/0065105 A1 | 3/2013 | Faust | |
| 2013/0115505 A1 | 5/2013 | Xie | |
| 2014/0087237 A1 | 3/2014 | Dhar et al. | |
| 2014/0349147 A1 | 11/2014 | Shaffer, II | |
| 2015/0132668 A1 | 5/2015 | Oi | |
| 2015/0140376 A1 | 5/2015 | Shaffer, II | |
| 2016/0036109 A1 | 2/2016 | Kim et al. | |
| 2016/0111755 A1 | 4/2016 | Liu | |
| 2016/0197373 A1 | 7/2016 | Shaffer, II | |
| 2016/0380259 A1 | 12/2016 | Yang | |
| 2017/0077545 A1 | 3/2017 | Shaffer, II | |
| 2017/0244134 A1 | 8/2017 | Shaffer, II | |
| 2017/0373298 A1 | 12/2017 | Kitoh et al. | |
| 2018/0053926 A1 | 2/2018 | Shaffer, II | |
| 2018/0375145 A1 | 12/2018 | Ochiai | |
| 2019/0379036 A1 | 12/2019 | Cadena | |
| 2020/0091521 A1 | 5/2020 | Shaffer, II | |

FOREIGN PATENT DOCUMENTS

| | | | | |
|---|---|---|---|---|
| CN | 1220289 C | 9/2005 | | |
| CN | 101202356 A | 6/2008 | | |
| CN | 101379652 A | 3/2009 | | |
| CN | 104538568 B | 4/2015 | | |
| DE | 2160868 A1 | 6/1973 | | |
| DE | 3822462 C1 | 11/1989 | | |
| DE | 19608326 A1 | 9/1997 | | |
| DE | 10058381 A1 | 6/2002 | | |
| DE | 102004018619 A1 | 11/2005 | | |
| EP | 0177225 A1 | 11/1988 | | |
| EP | 0402265 B1 | 3/1995 | | |
| EP | 0631338 A | 4/2000 | | |
| EP | 1329973 A1 | 7/2003 | | |
| EP | 1418638 A2 | 5/2004 | | |
| EP | 1419549 A1 | 5/2004 | | |
| EP | 1478035 A2 | 11/2004 | | |
| EP | 1986250 A1 | 10/2008 | | |
| EP | 2017918 A1 | 1/2009 | | |
| EP | 2273580 A2 | 1/2011 | | |
| EP | 2405524 A1 | 1/2012 | | |
| EP | 2471129 B1 | 7/2012 | | |
| EP | 2645450 A1 | 10/2013 | | |
| EP | 2696395 A1 | 2/2014 | | |
| EP | 3016182 A1 * | 5/2016 | | H01M 10/18 |
| EP | 3196964 A1 | 7/2017 | | |
| EP | 3316353 A1 | 5/2018 | | |
| EP | 3480867 A1 | 5/2019 | | |
| FR | 55043 E | 6/1951 | | |
| GB | 1532712 A | 11/1978 | | |
| JP | S51-069142 A | 6/1976 | | |
| JP | 55-024321 | 2/1980 | | |
| JP | S59-121787 A | 7/1984 | | |
| JP | S59-138076 A | 8/1984 | | |
| JP | S59196560 A | 11/1984 | | |
| JP | S60189867 A | 9/1985 | | |
| JP | H06314567 A | 11/1994 | | |
| JP | 07073871 A * | 3/1995 | | |
| JP | H07-057768 A | 3/1995 | | |
| JP | H09-045363 A | 2/1997 | | |
| JP | 10223211 A * | 8/1998 | | |
| JP | 10247491 A * | 9/1998 | | |
| JP | 2000-243403 A | 9/2000 | | |
| JP | 2000-340265 A | 12/2000 | | |
| JP | 2003-249259 A | 9/2003 | | |
| JP | 2004-095402 A | 3/2004 | | |
| JP | 2004-158343 A | 6/2004 | | |
| JP | 2005-032642 A | 2/2005 | | |
| JP | 2005-056761 A | 3/2005 | | |
| JP | 2005-064208 A | 3/2005 | | |
| JP | 2005-259379 A | 9/2005 | | |
| JP | 2007-012596 A | 1/2007 | | |
| JP | 2007-242593 A | 9/2007 | | |

(56) References Cited

FOREIGN PATENT DOCUMENTS

| | | |
|---|---|---|
| JP | 2009-164146 A | 7/2009 |
| JP | 2009-252548 A | 10/2009 |
| JP | 2010-251159 A | 11/2010 |
| JP | 2010-277862 A | 12/2010 |
| JP | 2011-009039 A | 1/2011 |
| JP | 2012-234823 A | 11/2012 |
| JP | 2014-534582 A | 12/2014 |
| JP | 5333576 B2 | 11/2016 |
| JP | 2019-087414 A | 6/2019 |
| KR | 10-0194913 | 6/1999 |
| KR | 10-2001-0072859 A | 7/2001 |
| KR | 10-2001-0097437 | 11/2001 |
| KR | 10-2003-0059930 | 7/2003 |
| KR | 10-2005-0020036 | 6/2005 |
| KR | 10-2010-0033831 A | 3/2010 |
| KR | 10-2015-0013272 A | 2/2015 |
| RU | 2030034 C1 | 2/1995 |
| WO | 1993/01624 A1 | 1/1993 |
| WO | 1994/007272 A1 | 3/1994 |
| WO | 1994/029911 A1 | 12/1994 |
| WO | 99/63611 A1 | 12/1999 |
| WO | 01/003224 A1 | 1/2001 |
| WO | 2003/007415 A1 | 1/2003 |
| WO | 2003/085751 A2 | 10/2003 |
| WO | 2006/105187 A1 | 10/2006 |
| WO | 2007/132621 A1 | 11/2007 |
| WO | 2010/085474 A1 | 7/2010 |
| WO | 2010/100979 A1 | 9/2010 |
| WO | 2011/109683 A1 | 9/2011 |
| WO | 2013/062623 A1 | 4/2012 |
| WO | 2017/136545 A1 | 8/2017 |
| WO | 2018/115836 A1 | 6/2018 |
| WO | 2018/213730 A2 | 11/2018 |
| WO | 2018/237381 A | 12/2018 |
| WO | 2020/102677 A1 | 5/2020 |
| WO | 2020/243093 A1 | 12/2020 |
| WO | 2021/188583 A1 | 9/2021 |

OTHER PUBLICATIONS

Machine translation of JP-H0773871-A (Year: 1995).*
Machine translation of JP H10247491A (Year: 1998).*
International Search Report for Application No. PCT/US2019/061725 dated Mar. 4, 2020.
International Preliminary Report on Patentability for Application No. PCT/US2019/061725 dated Feb. 26, 2021.
Written Opinion for Application No. PCT/US2019/061725, dated Oct. 13, 2020.
JP Notification of Refusal, Application No. 2021-526661, mailed Apr. 14, 2022.

* cited by examiner

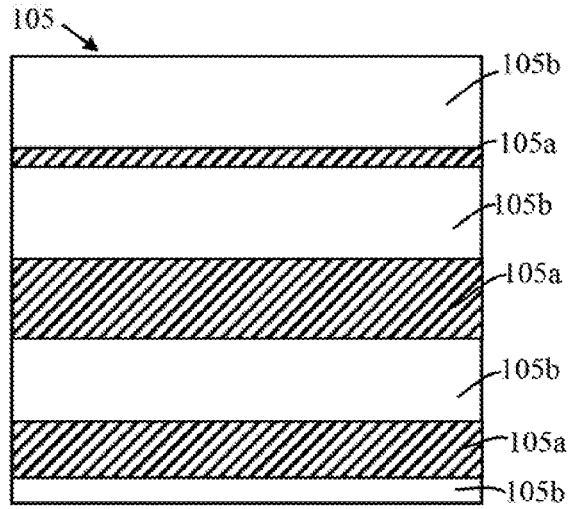
FIG-. 4C
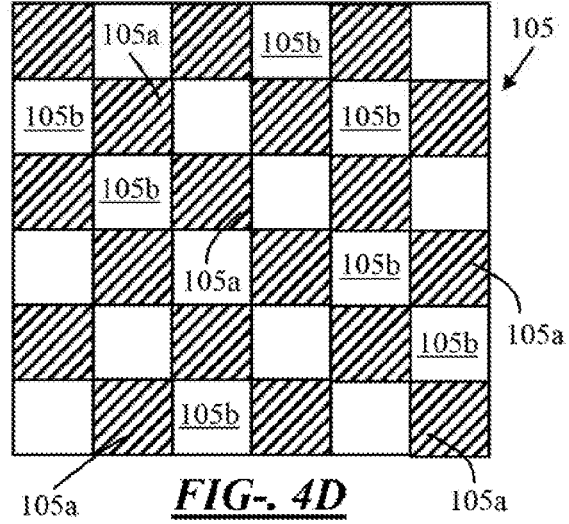
FIG-. 4D
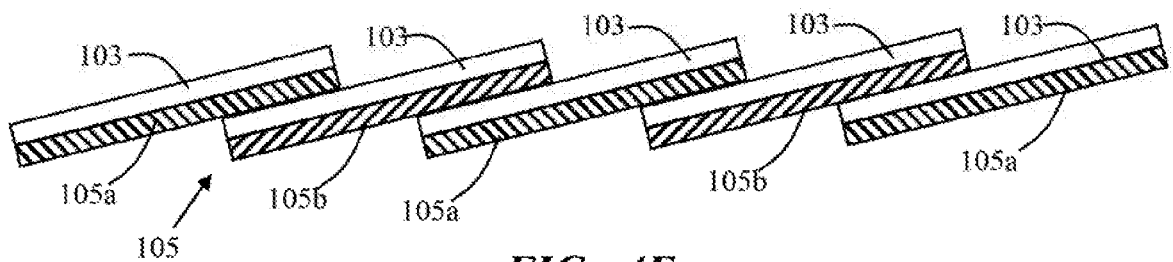
FIG-. 4E
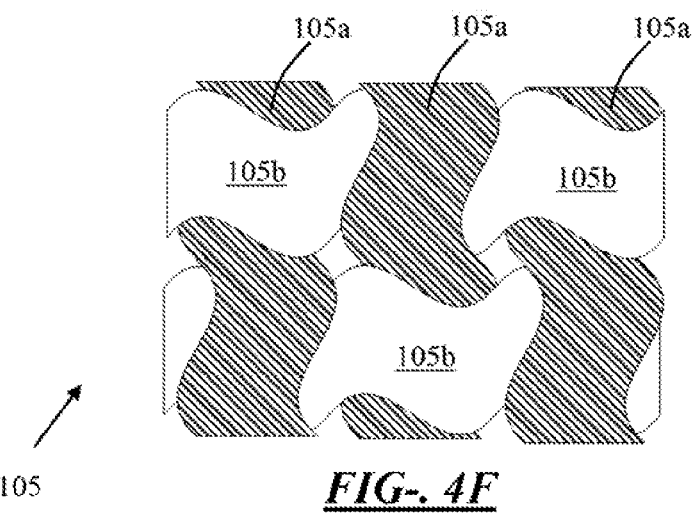
FIG-. 4F

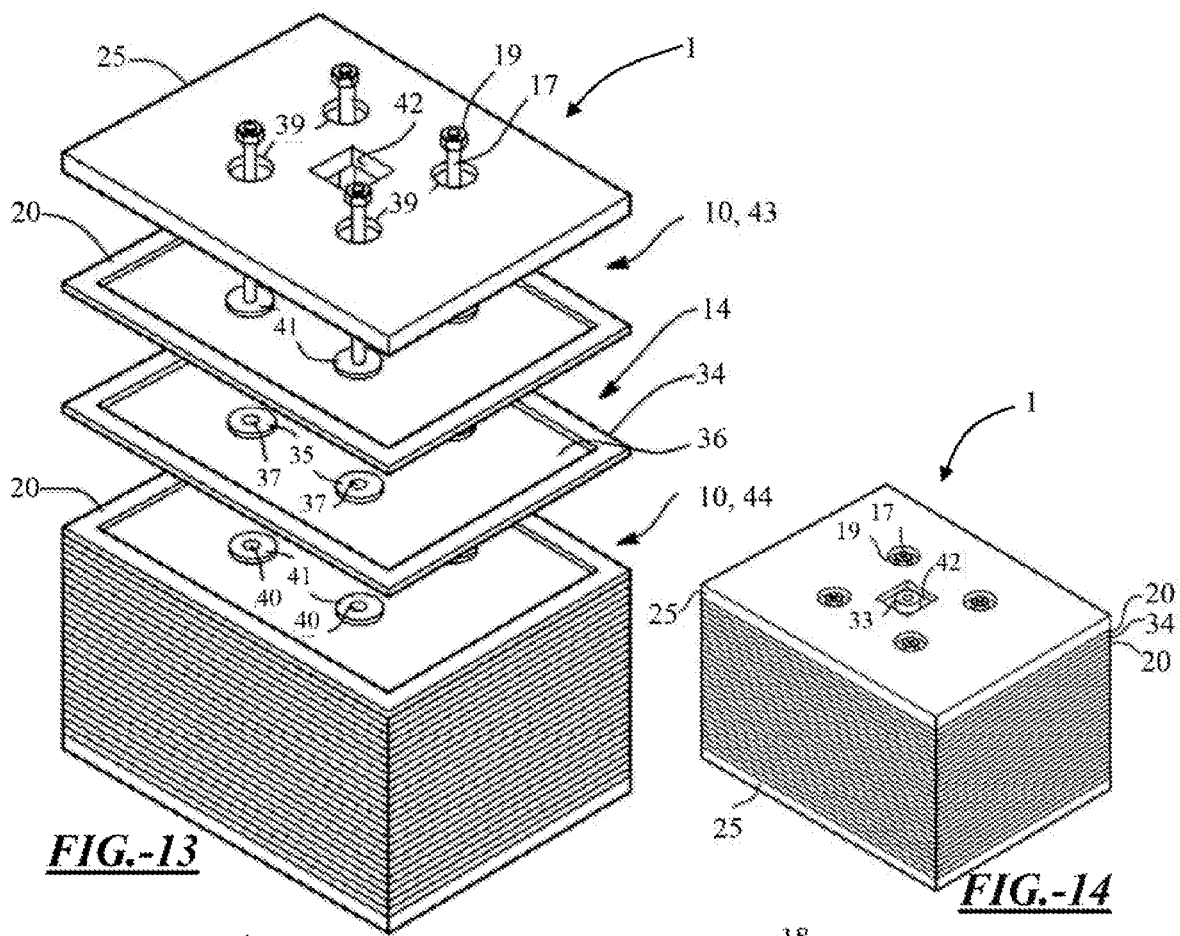
*FIG.-13*
*FIG.-14*
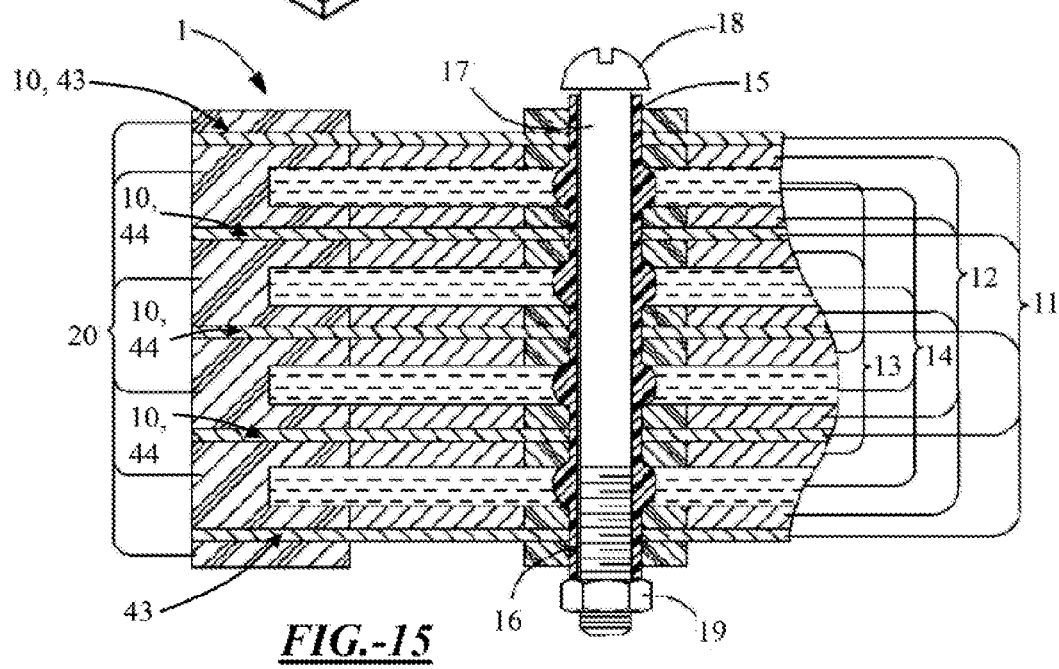
*FIG.-15*

ACTIVE MATERIALS USEFUL IN BALANCING POWER AND ENERGY DENSITY OF A BATTERY ASSEMBLY

CROSS-REFERENCE TO RELATED APPLICATIONS

This PCT application claims priority benefit to U.S. Provisional Application No. 62/767,919, filed on Nov. 15, 2018, the contents of which are incorporated herein by reference in their entirety.

FIELD

The present disclosure relates generally to battery plates useful in bipolar battery assemblies and methods for the preparation of such assemblies. The present disclosure may find particular use in the preparation of battery plates by providing for discrete active materials which optimize the power and energy density of a battery assembly.

BACKGROUND

Bipolar batteries often require an active material located on surfaces of battery plate substrates. Typically, bipolar batteries comprise a number of bipolar plates and two monopolar end plates. The bipolar plates are arranged in a stack such that anodic material of one plate faces cathodic material of the next plate. In most assemblies, there are battery separators located between the adjacent plates, which allow an electrolyte to flow from cathodic material to the anodic material. Disposed in the space between the plates is an electrolyte, which is a material that allows electrons and ions to flow between the anodic and cathodic material. The adjacent surfaces of the bipolar plates with the separator and the electrolyte disposed between the plates form an electrochemical cell where electrons and ions are exchanged between the anodic material and the cathodic material. The structure of the battery is arranged such that each cell (i.e., electrochemical cell) formed by the bipolar plates is sealed to prevent flow of electrolyte out of the cell.

Generally, to influence both the energy density and power density of a bipolar battery assembly, there are four variables of the active material (e.g., cathodic and anodic material) which may be modified. The four variables include: the type of active material, the amount of active material, the shape of the active material, and access of active material to electrolyte.

The type of active material may be selected to optimize a higher energy density or a higher power density. Exemplary lead-based active materials include a monobasic lead, tribasic lead, and tetrabasic lead. For a battery with a high energy density, a tetrabasic lead may be preferred, while for a battery with a high-power density, a tribasic lead may be preferred. As an example, in a starting lighting ignition (SLI) battery, a tribasic lead may be utilized to achieve a higher power rating, such as a Cold Cranking Amps (CCA) rating. As another example, in a deep-cycle battery, a tetrabasic lead may be utilized for a higher energy density and achieving a long, deep-cycle life. High power batteries, such as SLI batteries, may be useful in providing short bursts of power, while deep-cycle batteries may be useful in providing longer load durations. For example, an SLI battery may be used for starting a vehicle engine while a deep-cycle battery may power vehicle audio. At times, it is desirable to optimize for both a higher power density and higher energy density while still controlling overall package sizing, but it has been found that a simple mixture of tribasic and tetrabasic lead does not yield both properties. Rather, acid diffusion tends to control both the power and energy such that neither is rendered at a high output or sufficiently long duration. A balance of both high power and high energy density may be particularly useful in situations which require both high power and a high charge acceptance, and may be able to self-equilibrate between a rapid charge and a discharge event. For example, a battery with both high power and high energy density may be particularly useful in start-stop energy storage batteries, as these batteries may operate in a constant partial state of a charging condition.

The amount and shape of active materials are also critical to the performance of the bipolar batteries. Traditionally, active paste is applied to a lead alloy grid using pasting equipment that pumps the paste through an orifice as an appropriate metal grid is passed underneath supported by a belt. The processes are designed to apply the paste to the thickness of the grid to control paste thickness and weight. Belt pasting equipment can be used to paste active paste on bipolar plates. Typically, bipolar plates are designed as flat plates. The flat bipolar plates can be passed under a paste box with shoes installed to control the paste height. Typically, the positive active material is applied first and then the bipolar plate is flipped and passed under a second pasting line to deposit the negative active material. Bipolar plates with a paste frame can be pasted using belt pasting equipment. Monopolar plates with a paste frame can be pasted using belt pasting equipment. The paste is deposited into the pocket formed by the frame of the bipolar and/or monopolar plate as it passes under the paste box. A shim may need to be added to the bottom of the pocket to minimize flexing of the bipolar plate as it passes under the paste box as the paste is pumped with high pressure onto the bipolar plate. The bipolar plate can be flipped and paste can be applied to the pocket on the negative side of the plate. As the battery plate is passing under the box the leading and trailing edge of the bipolar plate frame becomes coated with a thin layer of paste which must then be removed to minimize the chance of shorting the formed battery during operation. Some groups have pasted a grid, sometimes made of plastic that is sized to fit into or onto the bipolar plate. In doing this, they avoid having to clean the leading and trailing frame edges; however, the disadvantage is increased cost and reduced energy density. The design of the resulting bipolar plates useful with these processes is a planar surface with no protrusions and further any planar features are typically coincident with the paste thickness. Thus, secondary cleaning operations are required to ensure no paste dust or film is present that may interfere with sealing of the bipolar plates or the operation of the batteries formed from the bipolar plates. These processes also present similar problems for the manufacture of the monopolar plates disposed at the end of stacks of battery plates.

SUMMARY

The present disclosure relates to a battery plate comprising: a) a substrate having a first surface opposing a second surface; b) one or more active materials disposed on the first surface, second surface, or both the first surface and the second surface of the substrate; and wherein the one or more active materials include two or more discrete active material regions. The battery plate may be one or more monopolar plates, bipolar plates, dual polar plates, or a combination thereof. The two or more discrete active material regions may differ, be the same, or a combination thereof by chemical composition, density, thickness, porosity, one or more other physical properties, or a combination thereof.

The present disclosure further relates to a battery plate comprising: i) one or more projections extending from the first surface, the second surface, or both of the substrate that are disposed within and do not extend beyond the active material; ii) one or more projections extending from the substrate which project beyond at least a portion of one or more active materials, and wherein the surface of the one or more projections beyond the one or more active materials is substantially free of the one or more active materials or a dust formed from the one or more active materials; and/or iii) a frame about a periphery of the substrate, wherein the frame or a portion thereof, in the direction transverse to the one or more surfaces upon which the active material is deposited, projects beyond the one or more active materials and is substantially free of the one or more active materials or the dust formed from the one or more active materials; and wherein the battery plate is adapted to form part of one or more electrochemical cells in a battery assembly.

The present disclosure further relates to a battery assembly comprising a plurality of battery plates according to the teachings herein.

The battery plates disclosed herein may be useful in battery assemblies for the storage of electricity and to generate electricity for use in a variety of environments. The use of one or more active materials in two or more discrete active material regions may allow for providing a battery assembly with both a high-power density and a high-energy density. A plurality of active materials discrete from one another may allow the battery assembly to self-equilibrate to provide for both rapid charge and discharge events, while also allowing for long durations of partial discharge.

The battery assemblies are designed to handle the pressures and heat generated during operation without undue damage to the outside surface of the article and so that the liquid electrolyte is contained in the article. The battery plates and assemblies disclosed can be assembled using conventional materials, processes, be adapted to different shaped spaces based on available packaging space, and allow scaling of size to delivery varying levels of energy. The disclosed battery plates and methods allow for preparation of battery plates without active material (e.g., paste) or dust from the active material contacting one or more nonplanar structures of a substrate. The disclosed battery plate and method is advantageous in having nonplanar structures free of the active material to allow for forming a seal with one or more other nonplanar structures without active material therebetween. By being free of active material between nonplanar structures, a potential leak path for liquid electrolyte and/or gasses is prevented, and thus, potential short circuiting of a battery assembly is avoided. The method requires less capital to run and allows higher throughput. In particular, the cycle time for applying the paste to a surface may be about 2 seconds or greater, about 15 seconds or less, about 10 seconds or less, or even about 6 seconds or less.

BRIEF DESCRIPTION OF THE DRAWINGS

FIG. 4C illustrates asymmetric and discrete active material regions.
FIG. 4D illustrates uniformly and interspersed active material regions.
FIG. 4E illustrates layered and offset discrete active material regions.
FIG. 4F illustrates woven discrete active material regions.
FIG. 13 is a partially exploded view of a stack of battery plates.
FIG. 14 is a perspective view of a stack of battery plates.
FIG. 15 illustrates a cross-section of a battery assembly.

DETAILED DESCRIPTION

Figure 1:
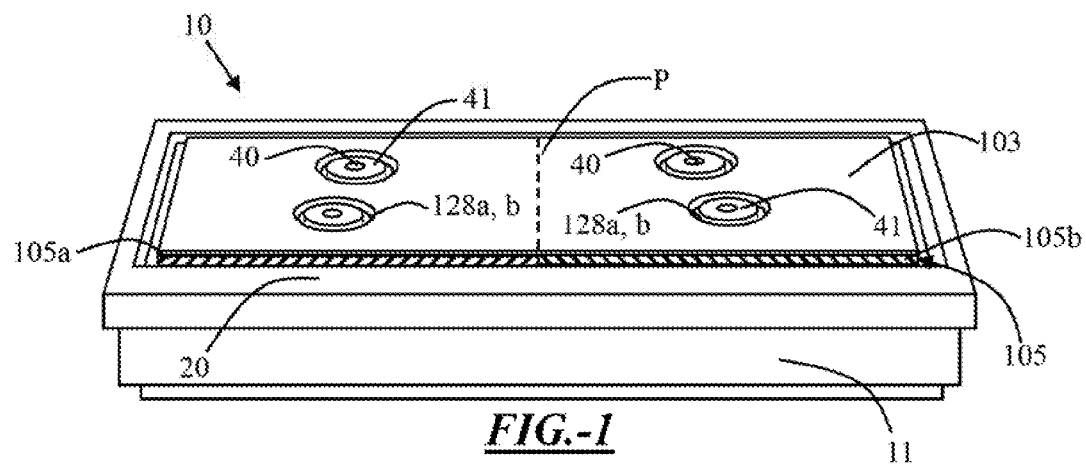
FIG. 1 illustrates a perspective view of a battery plate.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Battery Plate(s)

The disclosure relates to battery plates useful in use as bipolar plates, monopolar plates, dual polar plates, the like or any combination thereof. A battery plate may function as one or more electrodes, include one or more electroactive materials, be part of an electrochemical cell, form part of one or more sealing structures, or any combination thereof. A plurality of battery plates may function to conduct an electric current (i.e., flow of ions and electrons) within the battery assembly. A plurality of battery plates may form one or more electrochemical cells. For example, a pair of battery plates, which may have a separator and/or electrolyte therebetween, may form an electrochemical cell. The number of battery plates present can be chosen to provide the desired voltage of the battery. The battery assembly design provides flexibility in the voltage that can be produced. The plurality of battery plates can have any desired cross-sectional shape and the cross-sectional shape can be designed to fit the packaging space available in the use environment. Cross-sectional shape may refer to the shape of the plates from the perspective of the faces of the sheets. Flexible cross-sectional shapes and sizes allow preparation of the assemblies disclosed to accommodate the voltage and size needs of the system in which the batteries are utilized. Opposing end plates may sandwich a plurality of battery plates therebetween.

One or more battery plates may include one or more bipolar plates. The one or more bipolar plates may include a single or a plurality of bipolar plates. Plurality as used herein means that there are more than one of the plates. A bipolar plate comprises a substrate. The substrate may be in the form of a sheet having two opposing faces. Located on the opposing faces are a cathode and an anode. The cathode and the anode may be in the form of a paste applied onto the substrate. The cathode, the anode, or both may include a transfer sheet. The bipolar plates may be arranged in a battery assembly in one or more stacks so that the cathode of one bipolar plate faces the anode of another bipolar plate, dual polar plate, or a monopolar plate, and/or the anode of each bipolar plate faces the cathode of another bipolar plate, dual polar plate, or monopolar plate.

One or more battery plates may be one or more monopolar plates. The one or more monopolar plates may include a single or a plurality of monopolar plates. The one or more monopolar plates may include a monopolar plate located at each opposing end of a plurality of battery plates. Opposing monopolar plates may include one or more bipolar plates located therebetween. One or more monopolar plates may be located adjacent to, may be part of, or may be, one or more end plates. For example, each of the monopolar plates may be located between an adjacent end plate and an adjacent bipolar plate. One or more monopolar plates may be attached to one or more end plates. One or more monopolar end plates may be affixed to an end plate as taught in any of U.S. Pat. Nos. 8,357,469; 9,553,329; and US Patent Application Publication No. 2017/0077545; incorporated herein by reference in their entirety for all purposes. One or more monopolar end plates may include one or more reinforcement structures as disclosed in US Patent Application Publication No. 2017/0077545. One or more monopolar plates may be prepared from the same substrates, anodes, and cathodes used in one or more of the bipolar plates. One monopolar plate of a battery assembly may have a substrate with a cathode disposed thereon. One monopolar plate of a battery assembly may have a substrate with an anode disposed thereon. The cathode, anode, or both may be in the form of a paste applied onto the substrate. The cathode, the anode, or both may include a transfer sheet. A surface or side of a monopolar plate opposing the anode or cathode and/or facing an end plate may be a bare surface of a substrate.

One or more battery plates may include one or more dual polar plates. A dual polar battery plates may function to facilitate electrically connecting one or more stacks of battery plates with one or more other stacks of battery plates, simplify manufacturing and assembly of the two or more stacks, or both. Using dual polar plate stacks to electrically connect two or more stacks of battery plates may allow the individual stacks of battery plates to be formed as a standard size (e.g., number of plates and/or electrochemical cells) and then assembled to form the bipolar battery assembly; easily vary the number of individual stacks of battery plates to increase or decrease the power generated by the bipolar battery assembly; or both. The dual polar plates may include one or more substrates. One or more substrates may include a single substrate or a plurality of substrates. One or more substrates may include one or more conductive substrates, one or more non-conductive substrates, or a combination of both. A plurality of conductive substrates may include a first conductive substrate and a second conductive substrate. For example, a dual polar plate may comprise a first conductive substrate and a second conductive substrate with a nonconductive substrate located therebetween. As another example, the dual polar plate may comprise a nonconductive substrate. As another example, the dual polar plate may comprise a single conductive substrate. The one or more substrates of the dual polar plate include opposing surfaces. The opposing surfaces may have an anode, cathode, current conductor, current collector, or any combination thereof deposited and/or in contact with a portion of the surface. A conductive substrate of the dual polar plate may have an anode or cathode deposited on a surface or on both opposing surfaces. Having the same anode or cathode on the opposing surfaces may simplify manufacturing by requiring only one electrical connection (e.g., via a positive or negative current conductor) to another current conductor of the one or more stacks (e.g., a positive or negative current conductor or terminal of a monopolar plate). A substrate of the dual polar plate may have a current collector disposed on one or both opposing surfaces. The current collector may be disposed between the cathode or the anode and a surface of the substrate. Exemplary dual polar plates and integration into a battery assembly are disclosed in U.S. Pat. Nos. 9,685,677; 9,825,336; and US Patent Application Publication No.: 2018/0053926; incorporated herein by reference in their entirety for all purposes.

The one or more battery plates may include one or more nonplanar structures. A nonplanar structure may mean that the shape of a surface of the battery plates may be any shape in which the plates can function. A nonplanar structure may be any feature which projects from and/or caves into a planar portion of a battery plate. A nonplanar structure may mean that a battery plate may be a nonplanar battery plate. A nonplanar structure may include one or more indented surfaces and/or protruding surfaces with respect to any plane passing through the plates. One or more nonplanar structures may be shapes which are regular or irregular. The shapes may include one or more concave or convex surfaces. Included in nonplanar structures are rectangles, cylinders, hemisphere, pyramid, saw tooth, and the like. One or more nonplanar structures may include one or more inserts, bosses, frames, projections, openings, ribs, corrugated structures, or any combination thereof. The one or more nonplanar structures may function to form one or more seals, channels, or both. The one or more nonplanar structures may be part of a substrate. The one or more nonplanar structures may function to increase an overall surface area of a substrate, battery plate, or both. For example, a substrate having a corrugated surface may have a larger surface area than a substrate with a relatively planar surface. A larger surface area may allow for increased voltage, current, or both. The one or more nonplanar structures may be within any portion of a battery plate. Within a stack of battery plates, the planar and/or nonplanar structure of the battery plates may be the same so as to provide for efficient functioning of the electrochemical cells that they assist in forming. The plurality of battery plates may include one or more monopolar plates, one or more bipolar plates, or any combination thereof.

One or more battery plates include one or more substrates. One or more substrates may function to provide structural support for the cathode and/or the anode; as a cell partition, so as to prevent the flow of electrolyte between adjacent electrochemical cells; cooperating with other battery components to form an electrolyte-tight seal about the battery plate edges, which may be on the outside surface of the battery; and, in some embodiments, to transmit electrons from one surface to the other. The substrate can be formed from a variety of materials depending on the function or battery chemistry. The substrate may be formed from materials that are sufficiently structurally robust to provide the backbone of a desired battery plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate may be formed from an electrically conductive material, e.g., a metallic material, or can be formed from an electrically non-conductive material. Exemplary non-conductive material may include polymers, such as thermoset polymers, elastomeric polymers, or thermoplastic polymers, or any combination thereof. The substrate may comprise a generally non-electrically conductive substrate (e.g., a dielectric substrate). The non-conductive substrate may have electrically conductive features constructed therein or thereon. Examples of polymeric materials that may be employed include polyamide, polyester, polystyrene, polyethylene (including polyethylene terephthalate, high density polyethylene and low-density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized. The composite may contain reinforcing materials, such as fibers or fillers commonly known in the art; two different polymeric materials, such as a thermoset core and a thermoplastic shell or thermoplastic edge about the periphery of the thermoset polymer; or conductive material disposed in a non-conductive polymer. The substrate may comprise or have at the edge of the plates a thermoplastic material that is bondable, preferably melt bondable. The one or more substrates may have one or more nonplanar structures. The one or more nonplanar structures may be integral with the substrate or affixed to the substrate. The one or more nonplanar structured may be molded as part of the substrate. The one or more nonplanar structures may include one or more raised edges, frames, inserts, protrusions, projections, openings, the like, or any combination thereof.

One or more substrates may have a raised edge about the periphery so as to facilitate stacking of the battery plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate may be a non-conductive material and may be a thermoplastic material. One or more substrates may include a frame. The frame may or may not include or be considered the raised edge. The frame about or integrated onto the substrate may be comprised of non-conductive material, such as a thermoplastic material. The use of non-conductive material enhances sealing the outside of the battery stack. The frame may include one or more assembly aids formed therein. The assembly aids may function to help align and retain one or more substrates, separators, or both in place while stacking to form the battery assembly. The assembly aids may include one or more projections, indentations, or both. For example, one or more male projections from one surface of a frame may align and sit within one or more female wells of a frame of an adjacent substrate and/or separator. The one or more female wells of a frame may be located on an opposite surface of the frame as the one or more male projections.

One or more of the battery plates may include one or more active materials. The one or more active materials may function as a cathode, an anode, or both of the battery plate. The one or more active materials may be any form commonly used in batteries to function as an anode, cathode, or both. A bipolar plate may have one or more active materials on a surface functioning as a cathode and one or more active materials on an opposing surface functioning as an anode. A monopolar plate may have one or more active materials on a surface functioning as a cathode or an anode while the opposing surface is bare of both an anode and cathode. A dual polar plate may have one or more active materials on a surface functioning as a cathode or an anode, while one or more similar active materials are on the opposing surface also functioning as a cathode or an anode. The cathode of one battery plate may be opposing the anode of another battery plate. The cathode may be referred to as one or more positive active materials (PAM). The anode may be referred to as one or more negative active materials (NAM). The one or more active materials may include any suitable active material which facilitates an electrochemical reaction with the electrolyte, the opposing one or more active materials, or both of the same electrochemical cell. The one or more active materials may be selected to have a reduction and/or oxidation reaction with the electrolyte.

The one or more active materials may comprise one or more materials typically used in secondary batteries, including lead acid, lithium ion, and/or nickel metal hydride batteries. The one or more active materials may comprise a composite oxide, a sulfate compound, or a phosphate compound of lithium, lead, carbon, or a transition metal. Examples of the composite oxides include Li/Co based composite oxide, such as $LiCoO_2$; Li/Ni based composite oxide, such as $LiNiO_2$; Li/Mn based composite oxide, such as spinel $LiMn_2O_4$, and Li/Fe based composite materials, such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, $AgO$, $NiOOH$, and the like. For example, in a lead acid battery, the one or more active materials may be or include lead dioxide ($PbO_2$), tribasic lead oxide (3PbO), tribasic lead sulfate ($3PbO \cdot PbSO_4$), tetrabasic lead oxide (4PbO), tetrabasic lead sulfate ($4PbO \cdot PbSO_4$), or any combination thereof. The one or more active materials may be in any form which allows the one or more active materials to function as a cathode, anode, or both of an electrochemical cell. Exemplary forms include formed parts, in paste form, pre-fabricated sheet or film, sponge, or any combination thereof. For example, one or more active materials may include a sponge lead. Sponge lead may be useful due to its porosity.

One or more of the active materials may be porous. Porosity may be advantageous in providing an increased surface area. A larger surface area may reduce the distance ions travel, thus increasing the power and energy density of one or more active materials. One or more active materials may have a lower, about equal, or higher pore surface area compared to one or more other active materials. A pore surface area may be about 0.05 $m^2/g$ or greater, about 1 $m^2/g$, about 1.5 $m^2/g$ or greater, or even about 2 $m^2/g$ or greater. A pore surface area may be about 20 $m^2/g$ or less, about 15 $m^2/g$ or less, about 10 $m^2/g$ or less, or even about 9 $m^2/g$ or less. A pore surface area of one or more active materials, one or more discrete active material regions, or both may be different than a pore surface area of one or more other active materials, discrete active material regions, or both. A pore surface area of one active material, discrete active material region (e.g., first), or both may be higher than a pore surface area of another active material, discrete active material region (e.g., second), or both. For example, a pore surface area of a first discrete active material region (e.g., higher power) may be about 8 $m^2/g$ to about 9 $m^2/g$. For example, a pore surface area of a second discrete active material region (e.g., higher energy) may be about 2 $m^2/g$ or greater to about 3 $m^2/g$ or greater.

Paste form of one or more active materials of at least one of the anode or cathode of an electrochemical cell may be particularly advantageous as it may allow for easy application of a plurality of active materials, forming of non-planar shapes, adapting to non-planar substrates, easily having one active material be distinct from another, allowing one or more non-active materials to be located therein, or any combination thereof. The one or more active materials may have one or more materials with a low density paste, high density paste, or both.

A high density may allow for one or more active materials to be disposed on one or more substrates, transfer layers, one or more other active materials, or any combination thereof. A high density may allow for one active material to be disposed on, adjacent to, or even distanced from another active material while maintaining the active materials discrete from one another. A high density may include a density of about 3.0 g/cc or greater, about 3.5 g/cc or greater, or even about 3.7 g/cc or greater. A high density may include a density of about 5 g/cc or less, about 4.5 g/cc or less, or even about 4.1 g/cc or less. For example, a high density may include a density of about 3.7 g/cc or greater to about 4.1 g/cc or less. A low density may include a density of about 2.0 g/cc or greater, about 2.5 g/cc or greater, or even about 2.6 g/cc or greater. A low density may include a density of about 3.5 g/cc or less, about 3.0 g/cc or less, or even about 2.9 g/cc or less. For example, a low density may include a density of about 2.6 g/cc or greater to about 2.9 g/cc or less.

The one or more active materials may include one or more additives which may be beneficial in providing or improving reinforcement, stability, conductivity, or a combination thereof. One or more additives may include floc or glass fibers for improved reinforcement. One or more additives may include various ligano-organic compounds for paste stability. One or more additives may be one or more conductive additives. One or more conductive additives may improve conductivity. One or more conductive additives may include carbon, nano-carbon, nano-silicon oxide, nano-titanium oxide, nano-polymers, the like, or a combination thereof. The one or more active materials selected for use in an anode and cathode may be selected to cooperate together to function as an electrochemical cell once a circuit is formed which includes the electrochemical cells.

The one or more active materials can include a plurality of active materials. The plurality of active materials may cooperate with one another, the electrolyte, or both to balance and/or optimize the power and energy outputs of the battery assembly. The plurality of active materials may be the same or different as one or more of the other active materials. The plurality of active materials may be selected such that the battery assembly is able to provide a high amount of power for a period of time, while also able to provide a high energy output for another, longer duration of time. The plurality of active materials may be discrete, or mixed with one another, or a combination thereof. A plurality of active materials discrete from one another may be formed as two or more discrete active material regions. One or more active materials of the same battery plate may be in contact with an electrolyte while another active material is distanced from the electrolyte. A plurality of active materials of the same battery plate may be in contact with both the electrolyte and a substrate. One or more active materials may be a barrier between another, different active material and the electrolyte. For example, an active material having tribasic lead sulfate may be located between the electrolyte and an active material having tetrabasic lead sulfate (e.g., the tribasic lead sulfate is closer to or in contact with the electrolyte while the tetrabasic lead sulfate is closer to or in contact with the substrate).

To provide for both high energy and high-power density, the plurality of active materials may be selected such that one active material reacts quicker with the electrolyte as compared to another active material. For example, a tribasic lead sulfate between a tetrabasic lead sulfate and an electrolyte may react first (e.g., oxidation) with the electrolyte. A first reaction between one active material and the electrolyte may provide for a quick, high power output while a second, later reaction between another active material and the electrolyte may provide for a long duration, higher energy output. One advantage of having the tribasic lead sulfate react first with the electrolyte, the tribasic lead sulfate may gradually disuse the sulfate to the tetrabasic lead sulfate which may partially regenerate the high power capacity of the electrochemical cell without requiring recharging of the battery assembly. Another advantage of having the tribasic lead sulfate react first with the electrolyte, the tribasic lead sulfate may provide a high charge acceptance before the tetrabasic lead sulfate completes its oxidation reaction with the electrolyte to provide a rapid initial charge acceptance.

The one or more active materials may include two or more discrete active material regions. The two or more discrete active material regions may function to react with the electrolyte at different times, rates, or both to result in differences in power and energy output to a load. One or more discrete active material regions may comprise one or more active materials which are substantially the same or different as the one or more active materials of one or more other discrete active material regions. One discrete active material region may react (e.g., oxidation reduction) first, quicker, or both with the electrolyte to provide a high power output at the start of a load. A discrete active material region which provides a high power output may be a high power paste. Another discrete active material region may react (e.g., oxidation reduction) second, slower, or both with the electrolyte to provide a higher energy, longer duration output during ongoing use by the load. A discrete active material which provides a high energy output may be a high energy paste. For example, a first discrete active material region may include a tribasic lead oxide and/or tribasic lead sulfate and a second discrete active material region may include a tetrabasic lead oxide and/or tetrabasic lead sulfate. An alternative example includes first discrete active material region with a high surface area with low density and a second discrete active material region with lower surface energy and higher density. One or more active material of one discrete active region may be in contact with, adjacent to, continuous with, discontinuous with, distanced from, or a combination thereof relative to one or more other active materials of another discrete active region. Continuous may be there are no gaps between one or more active materials of one discrete active region and one or more active materials of another discrete active region. Discontinuous may mean there are one or more gaps between one or more active materials of one discrete active region and one or more active materials of another discrete active region such that the discrete active regions are separated. One or more non-active layers may separate two or more active materials such that they remain discrete. One or more of discrete active regions may be in contact with or distanced from one or more other discrete active regions, non-active layers, substrates, electrolyte, or a combination thereof of a shared electrochemical cell. One or more discrete active regions may have a shape, size, configuration, or a combination thereof similar to, different from, reciprocal with, or a combination thereof to one or more other discrete active regions of the same battery plate. For example, a cross-section of the plurality of active materials taken parallel to a surface of the substrate may show one discrete active region of active material as a plurality of circles while another discrete active region of another active material may surround the plurality of squares while also having an outer perimeter similar to a shape defined within an interior periphery of the substrate, such as substantially square. Two or more discrete active regions may be layered relative to one another and a substrate. Two or more discrete active regions may be placed in a reoccurring pattern on a substrate or may be randomly located on the substrate. Two or more discrete active regions may be substantially symmetrical or asymmetrical relative to another. One or more discrete active regions may have a volume of one or more active materials substantially less than, equal to, or greater than a volume of one or more active materials of another discrete active region.

The one or more active materials, individually or as a plurality, may be of any desired shape or thickness. The one or more active materials may have a matching, nonmatching, reciprocal, and/or nonreciprocal shape to a substrate, transfer sheet, one or more other active materials, or a combination thereof which the one or more active materials may be disposed. One or more active materials may have similarly formed nonplanar structures as a substrate, transfer sheet, one or more other active materials, or a combination thereof. The one or more active materials may have a different shape than the substrates. The one or more active materials may have one or more indentations, protrusions, projections, openings, ribs, corrugated structures, or a combination thereof formed therein which match and align with one or more indentations, projections, openings, ribs, corrugated structures, or a combination thereof of a substrate, transfer sheet, another one or more active materials, or a combination thereof upon which the one or more active materials are disposed. One or more shapes (e.g., projections, opening, ribs, corrugated structures, and/or the like) may be formed on one or more active materials while on a transfer sheet and before application to a substrate, current collector, and/or the like. Forming may include embossing, impressing, molding, forming directly when pasting by varying the material thickness, the like, or any combination thereof. One surface of one or more active materials may be reciprocal with a substrate, transfer sheet, other active material(s), or a combination thereof, while an opposing surface is nonreciprocal. One surface of one or more active materials may be reciprocal with a substrate, transfer sheet, one or more other active materials, or combination thereof while an opposing surface of the one or more active materials is reciprocal with another transfer sheet, substrate, one or more other active materials, or combination thereof. For example, a surface of one or more active materials disposed on a substrate may be reciprocal with the surface of the substrate while the surface of the same one or more active materials disposed on a transfer sheet may be reciprocal with the surface of the transfer sheet. One or more active materials may be discrete from one or more other active materials used from the same anode or cathode of a battery plate. To be discrete, one or more active materials may be layered with one o more other active materials. Layering may be relative to a surface of a substrate upon which the one or more active layers are disposed. Layering may be substantially parallel, perpendicular, or any angle therebetween relative to a surface of the substrate. To be discrete, one or more active layers may be located at least partially or even fully within one or more other active layers. For example, a first active layer may be substantially enclosed or encircled by a second active layer. To be discrete, a plurality of active layers may be uniformly or non-uniformly distributed, such as across a surface of a substrate. One or more active materials may have any shape suitable for cooperating with one or more other active materials. One or more shapes may include dots, cubes, mounds, grid-shapes, the like, or any combination thereof. The one or more shapes may be formed during a pasting process of the one or more active materials.

The one or more active materials, individually or as a plurality, may have the same thickness across each or the thickness may vary. The one or more active materials may have a thickness of about 0.3 mm or greater, about 0.5 mm or greater, or even about 1 mm or greater. The one or more active materials may have a thickness of about 3 mm or less, about 2 mm or less, or even about 1.5 mm or less. The thickness of the layers of one or more active materials disposed between one surface of the substrate and surface of the transfer sheet, separator, and/or electrolyte may be uniform or may vary as desired for the particular battery assembly. The thickness across the layer one or more active materials may vary by about 0% or greater, about 25% or greater, or even by about 50% or greater. The thickness across the layer of one or more active materials may vary by about 90% or less, about 80% or less, or even about 75% or less. One or more active materials regions may have a same or different thickness as one or more other active material regions. One or more active material regions may have a thickness of about +/−0% or greater, about +/−10% or greater, or even about +/−25% or greater than one or more other active material regions. One or more active material regions may have a thickness of about +/−100% or less, about +/−90% or less, or even about +/−75% or less than one or more active material regions.

One or more battery plates may include one or more non-active layers. The one or more non-active layers may function to separate one or more active materials from one or more other active materials so that they may remain discrete. The one or more non-active layers may be a same or similar material suitable for use as one or more transfer sheets, separators, or both. The one or more non-active layers may include an electrolyte adsorbent material. For example, the one or more non-active layers may be an adsorbent glass mat. The one or more non-active layers may include electrolyte. The electrolyte may be the same or different as the electrolyte located between the anode and cathode of the same electrochemical cell. An electrolyte located between one or more active materials of the same anode or cathode of an electrochemical cell may allow for providing additional capacity within an electrochemical cell, maintaining low internal resistance, providing short diffusion distances, or a combination thereof. The one or more non-active layers may be continuous, discontinuous, or both on and/or between one or more surfaces of one or more active materials. If the active layers are discontinuous, an electrical path connecting the discontinuous layers may be provided. The electrical path may include one or more conductive transmitters. One or more conductive transmitters may include one or more conductive pins, rods, pads, grids, current collectors, the like, or a combination thereof. The one or more conductive transmitters may be used to electronically connect the discontinuous active layers.

One or more battery plates may include one or more transfer sheets. A transfer sheet may function to define one surface of the negative active material (e.g., anode) or positive active material (e.g., cathode), such as when formed in the mold; to facilitate transfer of the negative active material or positive active material from a mold to a surface of the substrate; or both. A transfer sheet may be disposed on a surface of one or more active materials, such as one or more negative active materials or positive active materials. A transfer sheet may be disposed on a surface of the negative active material or positive active material opposite a surface in contact with a substrate. A transfer sheet may substantially cover the surface of the negative active material or positive active material. The surface of the negative active material or the positive active material opposite the transfer sheet may be in contact with a substrate. A transfer sheet may have any suitable shape for cooperating with a mold, substrate, positive active material, negative active material, one or more non-active layers, or a combination thereof. A transfer sheet may be planar, nonplanar, or both. A transfer sheet may include one or more nonplanar structures. The nonplanar structures may be protrusions, projections, indentations, openings, ribs, corrugated structures, grating structures (e.g., grid), or a combination thereof. One or more nonplanar structures may be formed reciprocal or nonreciprocal to those of a substrate. The transfer sheet may include one or more openings. The one or more openings may align with on one or more openings of a substrate. The openings may share one or more of the same features as those described relative to the substrate. One or more nonplanar structures may be nonreciprocal to those of a substrate. For example, a transfer sheet may have a corrugated structure while a substrate is generally planar. The corrugated structure may allow a surface of the positive active material or negative active material applied on the transfer sheet to have a reciprocal corrugated structure while an opposing surface is substantially planar and conforms with the substrate. When the negative active material or positive active material in the shape formed in the mold is transferred to the substrate, the negative active material or positive active material are bonded on one surface to the substrate and on the opposing surface to the transfer sheet. The layer of negative active material or positive active material may be a relatively thin layer between one surface of the substrate and a surface of the transfer sheet. Thus, the edges of such layers are relatively thin and can be protected by the structures formed. For example, the edges of the negative active material, positive active material, transfer sheet, or any combination thereof may be protected by a frame of a battery plate, substrate, or both.

The transfer sheet may be prepared from one or more materials. The one or more materials may function to resist corrosion, allow transfer of ions from an anode to a cathode and/or vice versa, or any combination thereof. A transfer sheet may be prepared from any material which may not degrade in the presence of an electrolyte. An electrolyte, such as sulfuric acid, may be quite corrosive. The transfer sheet may comprise any material that can withstand exposure to the electrolyte; can release from the mold base and bond to the negative active material and positive active material; prevent passage of the positive active material and negative active material therethrough; and/or can form desired pores. The transfer sheet can be formed from continuous, discontinuous, woven, non-woven, or a combination thereof structures. Examples of such structures include absorbent glass mats, scrim, pasting papers, cellulose and the like. The transfer sheets may be prepared from glass or polymeric materials. Useful polymeric materials may be polyesters, polyolefins, natural or synthetic rubbers, natural cellulose, synthetic cellulose and the like. Exemplary materials that the transfer sheets may be prepared from include polyetheylene separators, porous rubber separators, or both. Suitable polyethylene separators may include RhinoHide from Entek and various Daramic materials. Suitable porous rubber separators may be those from Amerace, AGM, Hollingworth & Vose, and the like. The transfer sheets may have any thickness that functions to hold the active materials in place, allows for transfer from a mold to a substrate, allows transfer of electrolyte and ions therethrough, or any combination thereof. The thickness of the transfer sheets may be about 10 µm or greater, about 250 µm or greater, or even about 500 µm or greater. The thickness of the transfer sheets may be about 4 mm or less, about 2 mm or less, or even about 1 mm or less.

One or more transfer sheets may be porous. A porous material may be advantageous to allow electrolyte containing ions to pass through the transfer sheet. By allowing the electrolyte to pass through, the transfer sheet cooperates as part of the electrochemical cells to allow the anode and cathodes to function to collectively generate electrons. The pores may have a suitable size such that the transfer paste does not pass through the transfer sheet. The pores of the transfer sheet can be formed by any means which provides the desired pore size. A desired pore size may be in the micron range. A pore size of pores of a transfer sheet may be about 35 microns or greater, about 150 microns or greater, about 250 microns or greater, or even about 500 microns or greater. A pore size of pores of a transfer sheet may be about 2,000 microns or less, about 1,500 microns or less, about 1,000 microns or less, or even about 800 microns or less. The transfer sheet may be formed from sheets of suitable material that are processed to introduce pores. Processes to introduce pores may include chemical pore formers, punching, drilling, and the like.

The bipolar plates, monopolar plates, and/or dual polar plates having negative active materials or positive active materials on the surface may have a transfer sheet bonded to the active materials. Active material may refer to an electroactive material, cathode, anode, transfer sheet bonded to a cathode or anode, or any combination thereof. Before assembly of battery plates and battery assemblies, the transfer sheets may function to protect the active material, support transfer of the active material from a mold to a substrate, allow for one or more nonplanar structures to be formed within the active material, or any combination thereof. Once the battery plates are assembled as part of a battery assembly, one or more transfer sheets may reside within one or more electrochemical cells. One or more transfer sheets may function in conjunction with or in lieu of a separator to perform the function of the separator.

Battery Assembly

A battery assembly may include one or more electrochemical cells. An electrochemical cell may be formed by a pair of opposing battery plates with an opposing anode and cathode pair therebetween. One or more electrochemical cells may be sealed. The space of an electrochemical cell (i.e., between an opposing anode and cathode pair) may contain one or more separators, transfer sheets, electrolyte, or a combination thereof. For example, the space of an electrochemical cell may include two transfer sheets, a separator therebetween, and electrolyte. For example, the space of an electrochemical cell may include two transfer sheets and electrolyte while being free of a distinct separator. The electrochemical cells may be sealed through one or more seals formed about one or more channels; one or more frames and/or edges of battery plate, separators, or both; or any combination thereof which may form closed electrochemical cells. The closed electrochemical cells may be sealed from the environment to prevent leakage and short circuiting of the cells.

A battery assembly may include an electrolyte. The electrolyte may allow electrons and ions to flow between the anode and cathode. The electrolyte may be located within the electrochemical cells. As the one or more electrochemical cells may be sealed, the electrolyte may be a liquid electrolyte. The electrolyte can be any liquid electrolyte that facilitates an electrochemical reaction with the anode and cathode utilized. The electrolytes can be water based or organic based. The organic based electrolytes useful herein comprises an electrolyte salt dissolved in an organic solvent. In lithium ion secondary batteries, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more. The organic solvent should be compatible with the separator, transfer sheet, cathode and anode, and the electrolyte salt. It is preferable to use an organic solvent that does not decompose even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as γ-butyrolactone; sulfolane; 3-methylsulfolane; dimethoxyethane, diethoxyethane, ethoxymethoxymethane and ethyldiglyme. These solvents may be used alone or in combination of two or more. The concentration of the electrolyte in the liquid electrolyte should preferably be 0.3 to 5 mol/l. Usually, the electrolyte shows the highest conductivity in the vicinity of 1 mol/l. The liquid electrolyte should preferably account for 30 to 70 percent by weight, and especially 40 to 60 percent by weight of the electrolyte. Aqueous electrolytes comprise acids or salts in water which enhance the functioning of the cell. Preferred salts and acids include sulfuric acid, sodium sulfate or potassium sulfate salts. The salt or acid is present in a sufficient amount to facilitate the operation of the cell. The concentration may be about 0.5 weight percent of greater based on the weight of the electrolyte, about 1.0 or greater or about 1.5 weight percent or greater. A preferred electrolyte in a lead acid battery is sulfuric acid in water. The electrolyte may be able to pass through one or more separators, transfer sheets, or both of an electrochemical cell.

The battery assembly may include or be free of one or more separators. The one or more separators may function to partition an electrochemical cell (i.e., separate a cathode of an electrochemical cell from an anode of an electrochemical cell); prevent short circuiting of the cells due to dendrite formation; allow liquid electrolyte, ions, electrons or any combination of these elements to pass through; or any combination thereof. Any known battery separator which performs one or more of the recited functions may be utilized in the battery assemblies of the present teachings. One or more separators may be located between anode and a cathode of an electrochemical cell. One or more separators may be located between a pair of adjacent battery plates, which may include between bipolar plates or between a bipolar plate and a monopolar plate. The separator may be prepared from a non-conductive material, such as porous polymer films, glass mats, porous rubbers, ionically conductive gels or natural materials, such as wood, and the like. The separator may contain pores or tortuous paths through the separator which allows electrolyte, ions, electrons or a combination thereof to pass through the separator. The pores may be sized as described herein relative to the pore size of a transfer sheet. Among exemplary materials useful as separators are absorbent glass mats, and porous ultra-high molecular weight polyolefin membranes and the like. The separators may be attached about their periphery and/or interior to one or more end plates, battery plates, other separators, or any combination thereof. The separators may receive one or more posts therethrough. For example, one or more posts extending through a stack of one or more end plates, one or more battery plates, and/or one or more separators may retain a stack of a plurality of battery plates and one or more separators together. The separators may have a cross-section or surface area that is greater than the area of the adjacent cathode and anode. A larger area may allow for isolation of the anode from the cathode of the same electrochemical cell. The separator may completely separate the cathode portion of the cell from the anode portion of the cell. The edges of the separator may contact peripheral edges of adjacent battery plates. The edges of the separator, battery plate, or both may not have an anode or cathode disposed thereupon, so as to completely separate the anode portion of the cell from the cathode portion of the cell. The application of the active material to a transfer sheet, and then the transfer sheet to the substrate may be particularly advantageous in ensuring the edges of the separator and battery plates are free of the active material. The use of one or more transfer sheets within an electrochemical cell may allow for the electrochemical cell to be free of a separator if desired.

One or more separators may include frames. The frames may function to match with the edges or frames of adjacent battery plates and form a seal between the electrochemical cells and the outside of the battery. The frame may be attached to or integral with a separator. The frame can be attached to the separator about the periphery of the sheet forming the separator using any means that bonds the separator to the frame and which can withstand exposure to the electrolyte solution. For example, the frame may be attached by adhesive bonding, melt bonding or molding the frame about the periphery of the separator. The frame can be molded in place by any known molding technic, for example thermoforming, injection molding, roto molding, blow molding, compression molding and the like. The frame may be formed about the separator sheet by injection molding. The frame may contain a raised edge adapted to match raised edges disposed about the periphery of the substrates for the battery plates. Raised edges in one or both of the battery plate substrates and the frames of the separators can be matched to form a common edge for the battery stack and to enhance the seal between the electrochemical cells and the outside of the battery. To seal about edges of the plurality of battery plates and one or more separators to prevent leakage of an electrolyte and evolved gasses from the electrochemical cells, isolate the electrochemical cells to prevent short-circuiting, the article may be sealed using an endo or exoskeleton sealing system as disclosed in commonly owned US Patent Publication Nos. 2010/0183920, 2014/0349147, 2015/0140376, and 2016/0197373 incorporated in their entirety by reference.

The battery assembly may include one or more inserts. One or more inserts may include a plurality of inserts. The one or more inserts may function to interlock with one or more other inserts, define a portion of one or more channels passing through the stack, form leak proof seal along one or more channels, cooperate with one or more valves, or any combination thereof. One or more inserts may be part of one or more end plates, battery plates, separators, or any combination thereof. One or more inserts may be free of active material, transfer sheet, or both. The one or more inserts may have any size and/or shape to interlock with one or more inserts of a battery plate, end plate, separator, or combination thereof; form a portion of a channel, form a leak proof seal along one or more channels, cooperate with one or more valves, or any combination thereof. The one or more inserts may be formed or attached to an end plate, substrate of a battery plate, separator, or combination thereof. The one or more inserts may be located within the periphery of a battery plate, separator, end plate, or combination thereof. One or more inserts may project from a surface of a substrate, separator, end plate, or combination thereof thus forming one or more raised inserts. One or more inserts may project from a substrate of a battery plate, a central portion of a separator, or both. One or more inserts may project substantially orthogonally or oblique from a surface of the substrate, separator, end plate, or combination thereof. One or more inserts may be attached to or integral with a portion of the battery plate, separator, end plate, or combination thereof. An insert which is integral with and projects from a surface may be defined as a boss. The opposing surface from which the insert projects therefrom may have a reciprocal indentation to allow forming of the boss. The reciprocal indentation may receive another insert therein, thus allowing formation of a channel. The one or more inserts may have one or more openings therethrough. The one or more inserts may be concentric and formed about one or more openings. One or more inserts may extend a length of an opening. A sealing surface may be formed between the outer diameter of one or more openings and an interior of one or more inserts. For example, a surface of the substrate, end plate, and/or separator may be substantially perpendicular to a longitudinal axis of the battery assembly located between an insert and an opening may be a sealing surface. One or more inserts may be capable of interlocking with one or more inserts of an adjacent battery plate, separator, and/or end plate to form a leak proof seal about a channel. For example, one or more battery plates may be machined or formed to contain matching indents, on a surface opposite from an insert, for bosses, inserts, sleeves, or bushings of a separator, battery plate, and/or end plate. The one or more inserts may pass through one or more nonplanar structures of one or more active materials, transfer sheets, or both. For example, one or more inserts may pass through an opening (e.g., void) of an active material and transfer sheet to allow interlocking with an adjacent insert. One or more suitable inserts may be those disclosed in U.S. Pat. Nos. 8,357,469; 9,553,329; and US Patent Application Publication No. 2017/0077545; incorporated herein by reference in their entirety for all purposes. One or more inserts may contain one or more vent holes. One or more inserts of one or more separators may contain one or more vent holes. The one or more vent holes may allow communication of selected fluids from one or more electrochemical cells to one or more channels. Each of the electrochemical cells may be independently electrochemically formed.

The battery assembly may include one or more openings. The one or more openings may include a plurality of openings. The openings may function to form one or more channels; house one or more seals; affix one or more end plates, battery plates, separators, or combination thereof to one another; or any combination thereof. The one or more openings may be formed in one or more of the end plates, battery plates, separators, active material, transfer sheets, or any combination thereof. One or more openings of an end plate, battery plate, separator, active material, transfer sheet, or combination thereof may align (i.e., be substantially concentric) with one or more openings of one or more other end plates, battery plates, separators, active material, transfer sheet, or any combination thereof. The one or more openings may align in a transverse direction across the length of the battery assembly. The transverse direction may be substantially parallel to a longitudinal axis of the article. The transverse direction may be substantially perpendicular the opposing surfaces of the substrates upon which a cathode and/or anode may be deposited. The openings may be machined (e.g., milled), formed during fabrication of the substrate (e.g., by a molding or shaping operation), or otherwise fabricated. Openings in a paste may be formed during a past application process. The openings may have straight and/or smooth internal walls or surfaces. The size and frequency of the openings formed in the substrate may affect the resistivity of the battery. The one or more openings may have a diameter able to receive a post therethrough. One or more openings in an active material and/or transfer sheet may have a diameter able to receive a post, an insert, or both therethrough. The openings may have a diameter of about 0.2 mm or greater, about 1 mm or greater, about 2 mm or greater, or even about 5 mm or greater. The openings may have a diameter of about 30 mm or less, about 25 mm or less, or even about 20 mm or less. One or more openings of a transfer sheet and/or active material (e.g., paste) may have a diameter larger than a diameter of an opening and/or insert of a separator, substrate, battery plate, end plate, or combination thereof. One or more openings of a battery plate and/or substrate may have a larger diameter than one or more other openings of the same battery plate and/or substrate. An opening may be about at least about 1.5 times, at least about 2 times, or even at least about 2.5 times larger than another opening. An opening may be about 4 times or less, about 3.5 times or less, or even about 3 times or less larger than another opening. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$.

One or more openings may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium, or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the battery plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

The battery assembly may include one or more channels. The one or more channels may function as one or more venting, filling, and/or cooling channels; house one or more posts; distribute one or more posts throughout an interior of the battery assembly; prevent liquid electrolyte from coming into contact with one or more posts or other components; or any combination thereof. The one or more channels may be formed by one or more openings of one or more end plates, battery plates, and/or separators, which are aligned. The one or more channels may extend through one or more openings of active material, transfer sheets, or both. The one or more channels may be referred to as one or more integrated channels. The one or more channels may pass through one or more electrochemical cells. The one or more channels may pass through a liquid electrolyte. The channels may be sealed to prevent electrolytes and gasses evolved during operation from entering the channels. Any method of sealing which achieves this objective may be utilized. One or more seals, such as inserts of the one or more end plates, battery plates, and separators, may interlock and surround one or more channels to prevent the liquid electrolyte from leaking into one or more channels. The one or more channels may pass through the battery assembly in a transverse direction. Thus, the one or more channels may be referred to as one or more transverse channels. The size and shape of the channels can be any size or shape that allows them to house one or more posts. The shape of the channels may be round, elliptical, or polygonal, such as square, rectangular, hexagonal and the like. The size of the channels housing one or more posts is chosen to accommodate the posts used. The diameter of the channel may be equal to the diameter of the openings which align to form one or more channels. The one or more channels comprise a series of openings in the components arranged so a post can be placed in the channel formed, so a fluid can be transmitted through the channel for cooling, and/or for venting and filling. The number of channels is chosen to support the end plate and edges of the end plates, battery plates, and separators to prevent leakage of electrolyte and gasses evolved during operation, and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of a plurality of channels are chosen so as to spread out the compressive forces generated during operation. The channels may be spread out evenly through the stack to better handle the stresses. The plurality of channels may have a cross-sectional size of about 2 mm or greater, about 4 mm or greater, or about 6 mm or greater. The upper limit on the cross-sectional size of the channels is practicality. If the size is too large, the efficiency of the assemblies is reduced. The channels may have a cross-sectional size of about 30 mm or less, about 25 mm or less, or even about 20 mm or less. A nonplanar surface of active material may allow for compensation or improved efficiency while the channels have a larger cross-sectional size. For example, a corrugated form of the active material may allow for the increased surface area and thus improved efficiency of the battery assembly.

The battery assembly may comprise a seal between one or more channels and one or more posts. One or more seals may be located in a channel, about an exterior of a channel, and/or about a post. The seal may comprise any material or form that prevents electrolyte and gasses evolved during operation from leaking from the electrochemical cells. The seal can be a membrane sleeve, series of matched inserts in the end plates, battery plates, and/or separators, or inserted in the channel, or any combination thereof. The membrane can be elastomeric. The channel can be formed by a series of sleeves, bushings, and/or inserts, inserted or integrated into the plates and/or separators. The inserts may be compressible or capable of interlocking with one another to form a leak proof seal along the channel. The inserts may be formed in place in the battery plates and/or separators, such as by molding them in place. The inserts may be molded in place by injection molding. The seal can be prepared from any material that can withstand exposure to the electrolyte, operating conditions of the electrochemical cells and forces exerted by inserting the post or by the post in the channel. The preferred polymeric materials that are described as useful for the posts and the substrates. The seal may be formed by sleeves, inserts or bushings placed between the bipolar and monopolar plates. The sleeves or inserts can relatively rigid and the bushings will generally be elastomeric. The inserts, bosses, sleeves and/or bushings may be adapted to fit within indentations in the bipolar and monopolar plates and/or separators or to have ends that insert into the openings of the plates creating one or more channels. The dual polar, bipolar and monopolar plates can be formed or machined to contain matching indents for the bosses, inserts, sleeves and/or the bushings. Assembly of the stack of plates with the bosses, inserts, sleeves or bushings may create interference fits to effectively seal the channels. Alternatively, the bosses, inserts, sleeves and/or bushings may be melt bonded or adhesively bonded to the plates so as from a seal at the junction. Alternatively the bosses, inserts, sleeves and/or bushings may be coated in the inside with a coating which functions to seal the channel. As mentioned above, the posts can function to seal the channels. It is contemplated that a combination of these sealing solutions may be utilized in single channel or in different channels. The components of the stack of plates, including dual polar, monopolar plates and bipolar plates, preferably have the same shape and common edges. This facilitates sealing of the edges. Where separators are present they generally have a similar structure as the battery plates to accommodate the formation or creation of the transverse channels. The seal may be a thermoset polymer, such as an epoxy, polyurethane or acrylic polymer injected between the bolt and the transverse channel. One or more channels may be formed by inserts, bosses, sleeves and/or bushings bonded to, in openings, and/or integral with openings in one or more battery plates and/or one or more separators. One or more posts in one or more channels may apply sufficient pressure to hold inserts, holes, bosses, sleeves and/or bushings in place to form a sealed passage. The one or more channels may be formed from inserts bonded and/or integrated into one or more battery plates and one or more separators. One or more posts may be bonded to one or more inserts, bosses and/or substrates of the battery by an adhesive bond or by fusion of thermoplastic polymers or both. The inserts may be inserted one or more battery plates and/or separators by interference fit or bonded in place by an adhesive. Inserts in one or more separators may contain one or more vent holes that may allow communication between one or more electrochemical cells and one or more channels. One or more vent holes may allow transmission of gasses from one or more electrochemical cells to one or more channels and prevent the transmission of one or more liquids (i.e., an electrolyte) from one or more electrochemical cells to one or more channels.

The battery assembly may include a membrane. The membrane may function to seal about the edges of one or more end plates, plurality of battery plates, one or more separators, one or more transfer sheets, one or more channels, or any combination thereof. The membrane may be bonded to the edges of the one or more end plates, plurality of battery plates, and/or one or more separators by any means that seals the edges of the end plates, battery plates, and separators and isolates the one or more electrochemical cells. The membrane may be a thermoplastic polymer that can be melt bonded, vibration welded, or molded about the substrates of the monopolar and bipolar plates. Each membrane may be the size of each side of the stacks to which they are bonded. The membranes may comprise a single unitary sheet which is wrapped about the entire periphery of the stack. One or more suitable membranes may be those disclosed in U.S. Pat. Nos. 8,357,469; 9,553,329; and US Patent Application Publication No. 2017/0077545; incorporated herein by reference in their entirety for all purposes.

A sealed battery assembly may be placed in a case to protect the formed battery. Alternatively, the membrane in conjunction with a protective covering over the monopolar plates at the end of the stack may be used as a case for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of battery plates and/or the opposite sides of the monopolar plates.

The battery assembly may include one or more posts. The one or more posts may function to hold the stack of components together in a fashion such that damage to components or breaking of the seal between the edges of the components of the stack is prevented, ensure uniform compression across the separator material, and ensure uniform thickness of the separator material. The one or more posts may have on each end an overlapping portion which engages the outside surface of opposing end plates, such as a sealing surface of each end plate. The overlapping portion may function to apply pressure on outside surfaces of opposing end plates in a manner so as to prevent damage to components or breaking of the seal between the edges of the components of the stack, and prevent bulging or other displacements of the stack during battery operation. The overlapping portion may be in contact with a sealing surface of an end plate. The stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack but such length varies based on the desired capacity of the battery. The posts may exhibit a cross-section shape and size so as to fill a channel. The posts may have a cross-sectional size greater than the cross-sectional size of one or more channels so that the posts form an interference fit one or more of the channels. The number of posts is chosen to support the end plate and edges of the substrates to prevent leakage of electrolytes and gasses evolved during operation and to prevent the compressive forces arising during operation from damaging components and the seal for the individual electrochemical cells and to minimize edge-stress forces that exceed the fatigue strength of the seals. The plurality of posts may be present so as to spread out the compressive forces generated during operation. There may be fewer posts than channels where one or more of the channels are utilized as cooling channels or vent/fill channels. For example, there may be four channels with three channels having a post located therein and one channel may be used as a cooling, vent, and/or fill channel. The posts may comprise any material that performs the necessary functions. If the post is utilized to seal the channels, then the material used is selected to withstand the operating conditions of the cells will not corrode when exposed to the electrolyte and can withstand the temperatures and pressures generated during operation of the cells. Where the posts perform the sealing function, the posts may comprise a polymeric or ceramic material that can withstand the conditions recited. In this embodiment the material must be non-conductive to prevent shorting out of the cells. The posts may comprise a polymeric material such as a thermoset polymer or a thermoplastic material. The posts may comprise a thermoplastic material. Exemplary thermoplastic materials include ABS (acrylonitrile-butadiene-styrene copolymers), polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. Of the polymeric materials recited above, ceramics and metals may be utilized. Suitable metals may be steel, brass aluminum, copper and the like. The posts can comprise molded posts, threaded posts or posts with one or more end attachments. The posts may be bonded to parts of the stacks, for example the substrates, inserts or bosses in the channels, and the like. The bonds can be formed from adhesives or fusion of the polymeric materials, such as thermoplastic materials. The one or more openings may have threaded surfaces. If threaded, the one or more posts may also be threaded to engaged with the threaded openings. Posts may include a head or nut on one end opposing a nut, hole for a brad, cotter pin, the like, or a combination thereof. This is generally the case for non-molded posts. The posts may be constructed in such a way as to be a one way ratcheting device that allows shortening, but not lengthening. Such a post would be put in place, then as the stack is compressed, the post is shortened so that it maintains the pressure on the stack. The post in this embodiment may have ridges that facilitate the ratcheting so as to allow the posts to function as one part of a zip tie like structure. Matching nuts and/or washers may be used with posts so as to compress the plates they are adjacent to when in place. The nuts and/or washers go one way over the posts and ridges may be present to prevent the nuts and/or washers from moving the other direction along the posts. In use, the holes in the posts will have the appropriate brads, cotter pins, and the like to perform the recited function. If the post is molded is can be molded separately or in place. If molded in place, in situ, a seal may need to be present in the channel to hold the molten plastic in place. The seal may be formed by the interlocking inserts, a separate seal therein, or both. A nonconductive post which is threaded may be used and can provide the necessary seal. Alternatively, a pre-molded nonconductive polymeric post may be designed to form an interference fit in the channel in a manner so as seal the channels. The posts may be formed in place by molding, such as by injection molding.

The battery assembly may include one or more valves. The one or more valves may function to draw a vacuum from an interior of the battery assembly, fill the battery assembly with an electrolyte, and/or vent the battery assembly during operation. The one or more valves may include a pressure release valve, check valve, fill valve, pop valve, and the like, or any combination thereof. The one or more valves may be connected to and/or in communication with one or more channels formed by one or more openings of an end plate, battery plate, separator, or any combination thereof. The one or more valves may be in communication with a channel, such as a channel having a post there through or free of a post. The article may include one or more valves as described in US Patent Application Publication No. 2014/0349147, incorporated herein by reference in its entirety for all purposes. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. The assemblies disclosed may contain a single check valve which releases pressure from the entire assembly when or before a dangerous pressure is reached. Some exemplary suitable valves are disclosed in U.S. Pat. Nos. 8,357,469; 9,553,329; 9,685,677; 9,825,336; and US Patent Application Publication No.: 2018/0053926; incorporated herein by reference in their entirety for all purposes.

The article may include one or more terminals. The assembly may contain one or more pairs of conductive terminals, each pair connected to a positive and negative terminal. The one or more terminals may function to transmit the electrons generated in the electrochemical cells to a system that utilizes the generated electrons in the form of electricity. The terminals are adapted to connect each battery stack to a load, in essence a system that utilizes the electricity generated in the cell. The one or more terminals may pass through one or more end plates, one or more battery plates, a membrane, and/or a case. The one or more terminals may pass through a battery plate from an end plate to the outside or passing through the side of the case or membrane about the assembly essentially parallel to the plane of the end plates. The terminal matches the polarity of the anode or cathode of the monopolar plate, dual polar plate, bipolar plate, or a combination thereof. The terminals are in contact with the conductive conduits in the assemblies. The cathode of the monopolar plate and the cathodes of one or more of the bipolar plates with a cathode current collector may be connected to independent positive terminals. The anode of the monopolar plate and the anodes of one or more of the bipolar plates with an anode current collector may be connected to independent negative terminals. The cathode current collectors may be connected and the anode current collectors may be connected in parallel. The individual terminals may be covered in a membrane leaving only a single connected positive and a single connected negative terminal exposed. Some exemplary suitable terminal assemblies are disclosed in U.S. Pat. Nos. 8,357,469; 9,553,329; 9,685,677; 9,825,336; and US Patent Application Publication No.: 2018/0053926; incorporated herein by reference in their entirety for all purposes.

The battery assembly may include one or more conductive conduits. The conductive conduits may function to transmit electrons from the current collectors in contact with the cathodes to one or more positive terminals. A typical bipolar battery may flow electrons from cell to cell through the substrate. Either the substrate at least partially comprises a conductive material or comprises conductive pathways through the substrate. When the circuit is closed that contains the cells electrons flow from cell to cell through the substrate to the positive terminal. It is contemplated that the assemblies may flow electrons through the substrates and cell, through a current collector to a current conductor or both. In the batteries disclosed herein having two or more stacks, each stack has a current conductor and/or a conductive conduit contacting the current collectors in contact with the anodes with a negative terminal and a current conductor and/or a conductive conduit contacting the current collectors in contact with the cathodes with a positive terminal. The conductive conduits from the two or more stacks may be arranged in parallel or in series. Parallel circuits comprise two or more circuits that are not connected to one another. Series circuits comprise two or more circuits that are arranged such that electrons flow through the circuits sequentially. When the conductive conduits are arranged in a series configuration, the battery may have only one negative terminal and one positive terminal. When the conductive conduits are arranged in a parallel manner, the battery may have single positive and negative terminals in which each circuit connects with each of the negative or positive terminals. Alternatively, each circuit may have separate negative and positive terminals. The terminals may be connected to the load which typically utilizes the electricity stored in the battery. Each of the current conductors and/or current conduits in contact with current collectors in contact with cathodes in a parallel arrangement may be contacted with separate positive terminals. Each of the current conductors and/or current conduits in contact with current collectors in contact with anodes in a parallel arrangement may be contacted with separate negative terminals.

Use of Battery Assembly

The battery assemblies disclosed herein are particularly useful for attaching to a load and having a circuit formed, which includes the electrochemical cells. Electrons may flow from a terminal to the load, and from the load back to a terminal. The load may be a system using electricity. This flow is maintained as long as the cells can generate electricity. If the stack of cells becomes fully discharged, the battery may need to undergo a charging step before additional use. If the substrate for the battery plates contains an electrically conductive material admixture, at an operating temperature of the battery assembly that is below its phase transformation temperature, the substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path. This allows the disabling of the battery before untoward consequences occur. Once a battery is discharged it may be recharged by forming a circuit with a source of electrons. During charging, the electrodes change function and the anodes during discharge become cathodes and the cathodes during discharge become anodes. In essence, the electrochemical cells flow electrons and ions in opposite directions as compared to discharge.

The battery assembly may be able to withstand internal pressures of 10 psi or greater without leaking or warping due to the internal pressures, about 20 psi or greater, about 50 psi or greater, and about 100 psi or less. The battery assembly can withstand internal pressures of about 6 psi to about 10 psi. The battery assembly may provide an energy density of about 34-watt hours per kilogram, about 40-watt hours per kilogram, or about 50-watt hours per kilogram. The battery assembly of the present teachings may generate any voltage desired, such as 6, 12, 24, 48, or 96 volts. The voltage can be higher although about 200 volts is a practical upper limit.

Method of Preparing Battery Plate(s)

One or more battery plates, battery assemblies, or both as disclosed herein may be prepared by the following steps.

The substrates useful for a bipolar plate, dual polar plate, monopolar plate, or a combination thereof may be formed or cut to shape. If the substrate comprises a nonconductive material, the substrate may be converted to a composite substrate. A composite substrate may be particularly useful in a traditional bipolar battery assembly. To convert the substrate into a composite substrate, one or more holes (e.g., openings) may be formed within the substrate. The holes may be formed by molding them in to the substrate, or machining the substrate to form the holes, any other suitable process, or combination thereof. The openings may be filled with a conductive material. The conductive material may be one that melts at a defined temperature, such as described hereinbefore. If utilized, one or more conductors may be adhered to one or both faces (e.g., surfaces) of the substrate. One or more conductors may include one or more metal sheets, screens, wires, foil, the like, or any combination. U.S. Pat. No. 9,553,329, incorporated herein in its entirety for all purposes, discloses the use of such conductors for dispersing electrons following within the electrochemical cell. Metal sheets, foil, or both may be bonded to the substrate using an adhesive. For example, the adhesive may be a nitrile-based rubber cement.

One or more active materials may be attached to a substrate, another active material, a non-active layer, a transfer sheet, or combination thereof. One or more active materials on the substrate may function to allow the battery plate, substrate, or both to function as an electrode plate. One or more active materials may be placed on one or both faces (e.g., surfaces) of the substrate. One or more active materials may include two or more discrete active material regions. One or more active materials may be attached directly to the substrate, another active material, a non-active layer, a transfer sheet, and/or may be attached onto a conductor (e.g., metal sheet, screen, wire, and/or foil) located on the substrate. One or more active materials may include both the positive active material (e.g., cathode), negative active material (e.g., anode), or both. Only one polarity (e.g., positive or negative) of one or more active materials may be located on only one surface of a monopolar plate. Differing polarities of one or more active materials may be located on opposing surfaces of a bipolar plate. The same or opposing polarity of one or more active materials be located on opposing surfaces of a dual polar plate. One or more active materials may be applied as a paste to the substrate, battery plate, transfer sheet, non-active layer, or any combination thereof.

To locate active material onto a substrate, paste forms of one or more active materials (e.g., anodes, cathodes) may be applied to a transfer sheet. One or more non-active layers may be located between two or more active materials, layers of active material, or both. One or more non-active layers may be located one or more active materials to form two or more discrete active material regions. The transfer sheet may be located within a mold when the paste is applied thereon. After application of one or more active materials to the mold, the transfer sheet with the paste thereon may be moved from the mold to contact a substrate, conductor thereon, or both. Upon contacting the substrate, conductor, or both, the one or more active materials may bond to the substrate, conductor or both. The mold may apply additional pressure to the transfer sheet, active material, or both to aid in bonding the one or more active materials to the substrate, conductor, non-active layer, or combination thereof. After application of one or more active materials as part of the battery plate, the transfer sheet may remain bonded to the one or more active materials or may be removed. The transfer sheet may be located on the one or more active materials (e.g., paste) on a surface opposite the surface of the active material which is bonded to the battery plate (e.g., substrate, conductor, or both). For example, for one or more bipolar plates, cathode paste(s) with a transfer sheet bonded thereto is applied to one surface of the substrate and anode paste(s) with a transfer sheet bonded thereto is applied to the other opposing surface of the substrate. As another example, for one or more monopolar plates, cathode paste(s) or anode paste(s) with a transfer sheet bonded thereto is applied to one surface of the substrate, while the opposing surface of the substrate remains free of active material. For another example, for one or more dual polar plates, a cathode paste(s) with a transfer sheet bonded thereto or an anode paste(s) with a transfer sheet bonded thereto are bonded to a surface of the substrate and the same polarity (e.g., positive or negative) of the paste(s) with a transfer sheet bonded thereto is applied to the opposite surface of the substrate. During attachment of active material to a substrate, one or more nonplanar structures within the active material may receive, be aligned with, nested with, or any combination thereof with one or more nonplanar structures of a substrate.

One or more openings formed within the one or more active materials, non-active layers, or both may be aligned with (e.g., concentric) with one or more openings, inserts, or both of a substrate. One or more openings formed within one or more active materials may receive one or more inserts therethrough. One or more indentations, wells, or both formed within the one or more active materials may receive one or more protrusions or projections of a substrate. One or more protrusions or projections of a substrate may assist in retaining the active material bonded thereto during curing. During attachment of active material to a substrate, the active material may conform to one or more nonplanar structures of the substrate. For example, one or more projections protruding from the substrate may compress, displace, or both a portion of the one or more active materials. Some of the projections and/or indentations may not pass through the one or more active materials and may function to enhance bonding of the one or more active materials to the substrate, battery plate, or both. The one or more active materials may remain free of contact with one or more portions of a substrate, battery plate, or both during and/or after application of the active material. The one or more active materials may remain free of contact with one or more nonplanar structures of the active material(s). By remaining free of contact with one or more nonplanar structures, one or more active materials may not interfere with sealing or bonding of one or more components of the battery assembly. The one or more active materials may remain free of contact with one or more frames, raised edges, projections, inserts, openings, or any combination thereof of the substrate. The use of a transfer sheet may allow for controlling placement of the one or more active materials onto the substrate to allow the one or more active materials to remain free of contact with one or more portions of a substrate, battery plate, or both.

One or more pastes of active material may be applied to a transfer sheet. The paste may be applied to a transfer sheet, non-active layer, another active material (e.g., paste), or a combination thereof located within a mold. This may allow for the transfer sheet with the one or more pastes thereon to later be easily bonded to a substrate having one or more nonplanar features formed therein, or both. The mold may comprise one or more movable plates. The movable plate may function to move a transfer sheet, one or more active materials, or both. The movable plate may move a transfer sheet underneath a location of one or more paste applications (e.g., nozzle, extruder) to have the paste applied thereon. The moveable plate may move a transfer sheet, one or more active materials, or both toward a substrate, away from a cavity (e.g., nest) of a mold, or both.

A movable plate may be movable within a mold by one or more conveying elements. The one or more conveying elements may be located below, adjacent to, or above a movable plate. The one or more conveying elements may be located anywhere suitable such that a transfer sheet, one or more active materials, or both are able to be disposed on the movable plate; the movable plate is able to be moved toward the substrate; the movable plate is able to apply pressure to a transfer sheet, one or more active materials, or both to bond to a substrate, battery plate, conductor; or any combination thereof. One or more conveying elements may include one or more rolling elements, such as one or more individual ball transfer units (i.e., drop-in, flange mount, recessed, stud mount, and/or the like), a ball transfer table, ball transfer rail, one or more gravity rollers, one or more automated rollers, a roller conveyor, a flat top conveyor, the like, or any combination thereof. A movable plate may be located on a conveyance system of the mold. The conveyance system may allow for the movable plate to be moved toward, away, or both relative to an extrusion portion of the mold (e.g., nozzle).

A movable plate may be movable within a mold by one or more extension elements. The one or more extension elements may function to lift a movable plate from within a cavity; retract a movable plate into the cavity; lift a movable plate outside of a cavity; lift a movable plate toward a substrate, battery plate, or both; apply pressure to a movable plate to thus apply pressure to a transfer sheet and/or active material; or any combination thereof. One or more extension elements may be located anywhere suitable for lifting a movable plate outside of a cavity and allowing for the movable plate to move a transfer sheet and active material onto a battery plate. One or more extension elements may be located below a movable plate; opposite a cavity, transfer sheet, active material, or combination thereof; or any combination thereof. One or more extension elements may include hydraulic, mechanical, and/or pneumatic lifting mechanisms. A moveable plate may be located within the base of the mold. The movable plate may move far enough to move the formed electrode paste completely out of the mold and into contact with the substrate. The substrate may be located opposite an opening in the mold. The opening may be the opening of a nest of the mold.

The movable plate may have a shape that matches the shape of the substrate to which the one or more active materials is to be applied. Match may mean having a shape substantially reciprocal to that of the substrate. The movable plate may have one or more nonplanar structures formed therein which substantially match those of the substrate. The movable plate may include one or more projections, indentations, inserts, frames, raised edges, openings, the like, or any combination thereof which match one or more similar features of a substrate. The movable plate may have a cross-sectional and/or surface area smaller than or equal to a cross-sectional area of a substrate. A cross-sectional and/or surface area may the area of the surface which faces toward the substrate, transfer sheet, or both. The movable plate may have a cross-sectional area smaller than a cross-sectional area defined by an interior of one or more frames, raised edges, or both of a substrate, battery plate, or both. The movable plate may be able to fit within an area defined by one or more frames, raised edges, or both when locating the one or more active materials onto the substrate, conductor, battery plate, or combination thereof. By have a cross-sectional or surface area smaller than that as defined by the frames, raised edges, or both; the movable plate is able to prevent contact between the active material and the frames, raised edges, or both. A portion of the movable plate may be substantially flat. The movable plate may be adapted to receive one or more different inserts. The one or more inserts may extend into a cavity of the mold.

The mold further includes a cavity in which the movable plate resides. The cavity functions to retain the movable plate, inserts, transfer sheet, active material, or any combination thereof. The cavity is defined by one or more walls. The one or more walls may enclose the perimeter of the movable plate to define the cavity. The one or more walls may be substantially perpendicular or offset relative to the movable plate. The angle of the walls may be measured relative to the surface of the movable plate facing toward a transfer sheet, substrate, battery plate, into the cavity, or any combination thereof. The walls of the mold can form any shape of electrode desired so as to match the shape of the battery plates as described herein. Where the mold is moving during the fill step, the walls of the mold may be thick enough to prevent dispensation of electrode paste when the walls are under a dispensation nozzle and when the nozzle is not in contact with the wall the paste is dispensed into the mold. The cavity may be defined as a nest. The nest may be particularly useful for retaining the movable plate, transfer sheet, one or more active materials, or combination thereof. The nest may be the area into which the active material is disposed, such that it is located onto the transfer sheet.

The mold may have one or more covers. A cover may function to partially close the mold, a cavity, or both; protect a cavity, movable plate, transfer sheet, one or more active materials, or combination thereof from debris and contaminants; cooperate with an extruding portion of the mold; receive active material therethrough; guide dispersion of the active material; or any combination thereof. Each cavity may have a respective cover or share a cover. A cover may be located opposite a movable plate. The cover may at least partially close the cavity. The cover may impart a shape to the one or more active materials within the cavity. The one or more active materials may fill the cavity such that the one or more activity materials contacts the cover. The cover may have a shape that substantially matches the shape of the substrate, battery plate, or both to which the one or more active materials is to be applied. Match may mean having a shape substantially reciprocal to that of the substrate, battery plate, or both. The cover may have one or more nonplanar structures formed therein which substantially match those of the substrate. One or more inserts of the mold may come in contact with or proximity to the cover. The cover may cooperate with one or more inserts to form one or more nonplanar structures within the one or more active materials. The cover may include one or more orifices. The one or more orifices may be adapted to receive one or more active materials, cooperate with an extruding portion of the mold, allow for injection of one or more active materials into a cavity, or any combination thereof. The shape and size of the one or more orifices may be adjusted to the process for applying the paste to the mold. The mold may extrude the paste such that it is continuous, discontinuous, or both. The mold may extrude a paste such that it is flat (e.g., uniform), uneven (e.g., varying surface, non-uniform), or both. The mold may even extrude a paste with one or more shapes, such as a pattern, formed therein. The mold, another device, or both may form one or more shapes onto the paste, active material, or both after extrusion. The mold, another device, or both may emboss, impress, or otherwise form one or more shapes after extrusion. For example, if a mold extrudes active material having a uniform thickness, one or more patterns may be embossed onto a surface of the active material (e.g., surface opposite from a transfer sheet). If the mold is stationary during filling, then the number of orifices and size of the orifices may be adjusted for this process. The cover may include a single orifice or a plurality of orifices. A plurality of orifices may be evenly spread across the cover to allow for even distribution of the active material into the cavity. If the mold is moving during filling, the one or more orifices may be elongated. Elongated orifices may extend across the length of the mold in the direction of travel. The mold may be designed to form an active material of uniform thickness or varying thickness according to the design criteria for the electrode.

A process for assembling a battery plate may comprise: a) placing a transfer sheet on a movable plate in an electrode mold, wherein the movable plate is disposed opposite of an opening in the electrode mold and is movable in the direction of and through the opening in the electrode mold; b) injecting a first active material in the form of a paste on to the transfer sheet on the movable plate so that the active material forms a layer in the shape formed by at least a portion of the movable plate; c) optionally placing one or more non-active layers on at least a portion of the first active material; d) injecting a second active material in the form of a paste on to the first active material, the transfer sheet, a portion of the one or more non-active layers, or any combination thereof; e) placing a substrate over the opening of the mold such that the area of one of the surfaces of the substrate upon which the first active material, the second active material, or both are desired to be located are lined up with the first active material, the second active material, or both in the mold; f) extending the movable plate through the opening of the mold until the first active material, the second active material, or both are contacted with and bonded to the substrate; g) retracting the movable plate away from the substrate back into the mold such that the first active material, the second active material, or both remain bonded to one of the surfaces of the substrate plate and the transfer sheet remains bonded to the surface of the first active material, the second active material, or both opposite of the surface of the first active material, the second active material, or both bonded to one of the surfaces of the substrate. The cycle time for applying the paste to a surface may be about 2 seconds or greater, about 15 seconds or less, about 10 seconds or less, or even about 6 seconds or less.

The method for preparing a battery plate useful as a bipolar plate or dual polar plate may further include: h) placing a second transfer sheet on a same or different movable plate in the electrode mold, wherein the movable plate is disposed opposite of an opening in the electrode mold and is movable in the direction of and through the opening in the electrode mold; i) injecting a first active material in the form of a paste on to the second transfer sheet on the movable plate so that the active material forms a layer in the shape formed by at least a portion of the movable plate; j) optionally placing one or more non-active layers on at least a portion of the first active material; k) injecting a second active material in the form of a paste on to the first active material, the transfer sheet, a portion of the one or more non-active layers, or any combination thereof; l) placing the substrate over the opening of the mold such that the area of one of the surfaces of the substrate, opposite to the surface upon which the first active material, the second active material, or both are already bonded upon, and in which the first active material, the second active material, or both are desired to be located is lined up with the first active material, the second active material, or both in the mold; m) extending the movable plate through the opening of the mold until the first active material, the second active material, or both are contacted with and bonded to the substrate, opposite an already bonded first active material, second active material, or both on the opposing surface; and n) retracting the movable plate away from the substrate back into the mold such that the first active material, second active material, or both remain bonded to one of the surfaces of the substrate plate and the second transfer sheet remains bonded to the surface of the first active material, the second active material, or both opposite of the surface of the first active material, the second active material, or both bonded to one of the surfaces of the substrate.

The transfer sheet may cover the entire movable plate so as to prevent contact of the one or more pastes with the surface of the movable plate and to allow complete transfer of the one or more pastes to the substrate. The cover may be closed over the mold after insertion of the transfer sheet. One or more pastes may then be injected into the mold through the one or more orifices in the cover using one or more injection nozzles to inject the paste. One or more pastes may be injected into the mold simultaneously or in subsequent steps. One or more pastes may be injected into the mold by a same nozzle or different nozzles. The one or more nozzles may be sealed about the one or more orifices so as to control the flow of paste into the mold. If the mold is moving, such as on a conveyor belt, the mold may move under the injection nozzle and the orifice may be elongated in the direction of movement. The mold may shape the injected paste into the desired shape of the active material for use with the battery plates. Extrusion into the mold may be started by pumping the active material though one or more orifices. Extrusion into the mold may be stopped by stopping the pumping action. The active material may be injected into the mold (e.g., cavity) at relatively low pressures. The active material may be injected into the mold (e.g., such as via mold line) at a pressure of about 50 psi or less, about 40 psi or less, or even about 30 psi or less. The active material may be injected into the mold transfer plate at a pressure of about 5 psi or greater, about 10 psi or greater. For example, the active material may be injected into a mold transfer plate at a pressure of about 5 psi to about 8 psi. After one or more active materials is injected and the one or more active materials are formed into the desired shape, the cover may be removed from the mold. A substrate is placed opposite the mold and the movable plate is moved in the direction of the substrate until the paste is contacted with the substrate and/or an electrode disposed on the substrate. The substrate and/or electrode on the substrate may be treated to roughen the surface of substrate and/or electrode on the substrate to enhance bonding of the paste thereto. Any known method of roughening these surfaces may be utilized. The substrate may be lined up with the moveable plate such that the active material will be placed in the desired position on the substrate. The moveable plate may be held in contact with the substrate and/or battery plate for a sufficient time to form a bond between the active material and the substrate and/or battery plate. Thereafter, the movable plate may be retracted back into the mold (e.g., cavity), leaving the active material bonded to the substrate and/or battery plate on the substrate. After retraction of the movable plate away from the battery plate, the transfer sheet may remain bonded to the active material. The application if active material to one surface of a battery plate, substrate, or both may result in a monopolar plate.

For preparing a bipolar plate, dual polar plate, or both; active material may be molded in a subsequent mold (e.g., cavity). The active material prepared in the subsequent mold may be the active material disposed on the opposing surface of the substrate, battery plate, or both. A different polarity or same polarity of active material may be injected in a second, or subsequent, mold (e.g. cavity). To form a bipolar plate, the active material may be a different, opposing polarity than that of the active material already applied thereon. To form a dual polar plate, the active material may be the same polarity than that of the active material already applied thereon. Either polarity of active material useful in forming a cathode or an anode is used to prepare a first electrode from the first mold and the second mold is used to form the opposite electrode of an anode or a cathode. Either electrode may be applied first, although traditionally the cathode may be applied first. The second electrode is formed in the same manner as the first electrode. The electrodes may have the same thickness or shape on both sides. The electrodes may have different shapes or thicknesses on the opposing sides. After formation of the second electrode, the substrate is moved to a position wherein the surface of the substrate and/or electrode not having active material disposed thereupon is opposite of the second mold. Thereafter the second electrode is contacted with the second surface and/or electrode of the battery plate. The battery plate may be rotated 180 degrees between applying the first and the second electrode to the substrate.

Protrusions from, indentations into, or openings through the surface of the battery plates or the frame may be molded into the structures when forming them by a molding process or added by a common molding process thereafter. One or more inserts of the mold may be used to shape a surface of the transfer sheet, active material, or both to be substantially reciprocal to that of the substrate, receive one or more portions of the substrate therethrough, or both. The one or more inserts may correspond to one or more protrusions, projections, indentations, openings, ribs, corrugated structures, or any combination thereof of a substrate. One or more inserts may be part of the movable plate, one or more walls of the mold, part of the cover, any other projection into or indentation away from the cavity of the mold, or any combination thereof. One or more inserts of a movable plate may project away from the movable plate into a cavity or nest of the mold, be indented inward into the movable plate away from the cavity or nest of the mold, or both. One or more inserts may function to form one or more nonplanar structures within the active material (e.g., paste). One or more inserts may function to create one or more voids, indentations, projections, ribs, corrugated structures, or any combination thereof within the active material. One or more inserts of the mold may create one or more indentations or wells within the active material. The one or more indentations or wells in the active material may receive one or more projections from a substrate, battery plate, or both. One or more inserts of the mold may extend through one or more voids (e.g., openings) of a transfer sheet, create one or more voids in a transfer sheet, or both. The one or more inserts prevent or guide placement of active material (e.g., paste) relative to the transfer sheet. For example, the one or more inserts of the mold which extend through the one or more openings (e.g., voids) of the transfer sheet prevent paste from entering the one or more openings, and thus forming openings (e.g., voids) within the active material. The openings of the active material area then aligned with the transfer sheet. The one or more voids may function to form a space for and/or receive one or more inserts of a substrate, battery plate, or both therethrough; prevent contact between one or more inserts of a substrate, battery plate, or both with the active material; have one or more channels extending therethrough; or any combination thereof. In other words, the first or first and second mold contain inserts that function to form voids in the first and/or second active materials injected into the mold. One or more inserts may be sized with a diameter smaller than, about equal to, or larger than one or more openings, inserts, or both of one or more substrates, battery plates, or both. One or more inserts of the mold may have a diameter larger than a diameter of an insert of a substrate. A larger diameter may result in a void created in the electroactive layer which may have an insert and/or channel pass therethrough with minimal or no contact. The inserts may have a height about less than, equal to, or greater than a thickness of a transfer sheet, active material layer (e.g., cathode paste layer, anode paste layer), or any combination thereof. Some of the protrusions may pass through the paste. The formation of the voids in the active material to match the protrusions allow assembly of the battery plates into batteries without contacting the protrusions with the active material and avoids contaminating the protrusions with the active material. By avoiding contact, costly cleaning operations are prevented. Additionally, by avoiding contact, the risk of negatively impacting the operation of the battery assembly due to the presence of active material on such protrusions is prevented. The negative impacts to operation may include poor sealing of and shorting out the battery assembly. Such protrusions may be substantially free of active material. Substantially free may mean about 5 percent or less, about 1 percent or less, or even about 0.1 percent or less of a surface area of the protrusions extending beyond the active material may include active material or dust of the active material thereon. Substantially free may mean about 0 percent or greater, about 0.01 percent or greater, or even about 0.05 percent or greater of a surface area of the protrusions extending beyond the active material may include active material or dust of the active material disposed thereon.

Method(s) of Preparing Battery Assembly

The present disclosure may further relate to a method of preparing a battery assembly using a plurality of battery plates as disclosed herein. The method may comprise forming a stack of a plurality of substrates having active material on one of the surfaces active material on the opposing surface. The method may include placing (e.g., stacking) one or more separators between pairs of substrates. One or more inserts, openings, or other nonplanar structures of one or more separators may align with one or more inserts, openings, or other nonplanar structures of one or more battery plates, substrates, separators, active material, transfer sheets, or any combination thereof. The method may be free of placing one or more separators between pairs of substrates. Separators may not be placed between substrates and/or battery plates if transfer sheets remain bonded to the active material, such that one or more transfer sheets are located between adjacent pairs of active material and are able to prevent contact between the active material of one battery plate with the active material of an adjacent battery plate. The method may include exposing the battery assembly or stack of battery plates to conditions at which the one or more active materials cure. The active material may be cured by exposing the active material to temperatures of about 15° C. or greater, about 20° C. or greater, about 30° C. or greater, or even about 40° C. or greater. The active material may be cured by exposing the active material to temperatures of about 95° C. or less, about 90° C. or less, about 80° C. or less, or even about 70° C. For example, an active material in paste form may be cured being exposed to a first temperature of about 40° C. to about 70° C. for about 12 to about 48 hours. The active material may be cured by exposing the active material to a second temperature and drying. The active material may be dried by exposing the active material to temperatures of about 25° C. or greater, about 30° C. or greater, about 40° C. or greater, or even about 50° C. or greater. The active material may be dried by exposing the active material to temperatures of about 105° C. or less, about 100° C. or less, about 90° C. or less, or even about 80° C. For example, an active material in paste form may be dried being exposed to a second or higher temperature of about 50° C. to about 80° C. for about 24 to about 72 hours. Curing and/or drying may occur before or after the battery plates are assembled into a stack.

The holes for the transverse channels may be pre-formed or machined into the substrate, metal sheets or foil, separator, anode, cathode, transfer sheet, and any other component present. The holes may be formed in the active material by forming voids in the active material while being applied onto a transfer sheet. The voids of the active material may align with one or more openings of the transfer sheet. Where the channels are formed using sleeves, inserts, bosses, and the like, they may be inserted into the battery plates and/or the separators. Where the inserts are molded in place, the inserts are molded to the battery plates and/or separators using known molding processes.

The frames and/or inserts may be molded into or onto the separators or the battery plate substrates using the following steps. The separator sheets may be cut to size (die punch, slit, stamped, etc). One or more sheets may be stacked to meet the required thickness of the separator. The sheets may be placed into a mold that places the sheets into a fixed position. The mold may form a periphery frame around the separator, any internal features about the transverse channels (e.g. bushings, inserts, bosses) as required, or both. Further, the mold is designed to not overly compress the separator material and to prevent plastic from damaging the separator material. Plastic is the injected into the mold and once the plastic is cooled the part is ejected.

The components are then stacked such that for each plate an anode faces a cathode of another plate. Preferably the sheets are stacked so that the edges of the substrates are aligned along with the edges of any other frame components. A plate with two or more guide pins or bolts may be used to support the stack. One or more assembly aids of one battery plate may align with one or more other assembly aids of an adjacent battery plate to support the stack during assembly. For example, one or more posts projecting from the frame may snap together with and reside within one or more wells of an adjacent frame. The components are stacked on the plate with the guide pins in an appropriate order consistent with the disclosure herein. Two or more of the transverse channels may be used for the alignment pins or bolts. Once the stack is completed, elastomeric membranes or sleeves may be inserted into the transverse channels. If the channel is sealed with bushings, inserts or plastic sleeves located between the holes in the plates a coating may be applied to the interior of the channel, interior of the holes, sleeves inserts and/or bushings. If the interior of the holes of the plates need to be threaded they are threaded either prior to assembly or after assembly using known techniques. The channel may be free of having an additional seal located therein, as the inserts of adjacent battery plates and/or substrates interlock to seal and form the channel.

One or more posts may be inserted into the stack. The one or more posts may be secured by the overlapping portion to the sealing surface of the opposing side of the monopolar plates. Where the overlapping portion is a mechanical attachment structure, such attachment structure is secured to the post. Where the post is injection molded in place, molten thermoplastic material is inserted into the channels and an overlapping portion of the molten material is formed on the sealing surfaces at both ends. The surface of the channels may be heated to melt the surface of the inside of the channels, in this embodiment the injected thermoplastic material bonds well to the inside of the channel. The thermoplastic material is allowed to cool. The channel may have a form inserted into the channels and a form for the overlapping portion of the formed at each end. A two-part thermoset material is then added to the channels and allowed to cure to form the post. Where the post is designed to fit into the channel by interference fit the post is inserted with appropriate force. Once the posts are secured and stable, the stack is removed from the guide pins and posts can be inserted into the channels used for the guide pins.

The method of assembling a battery assembly may further comprising applying a membrane. Where a membrane is applied to the edge surface of the stack, an adhesive is applied to either or both of the membrane or the edge of the stack, and the membrane and the edge of the stack are contacted so as to bond them together. The membrane may be held in place while the adhesive sets or cures using known mechanical means. The edges of the membrane can be sealed to the unsealed edges of other membrane sheets or membranes or end plates on the opposite surface of the monopolar plates. The sealing can be performed by an adhesive or by melt bonding. Alternatively, the membrane can be attached by melt bonding. In melt bonding, both the edge of the stack and the surface of the membrane to be bonded to the edge are exposed to conditions such that the surface melts without negatively impacting the structural integrity of the membrane or the stack. This can be achieved by contacting each with a hot surface, platen, hot fluid, air, radiation, vibration and the like, then contacting the membrane and edge of the stack along the melted surface and allowing the molten surfaces to cool and bond together. The membrane may be cut to fit a particular edge or can be a continuous sheet which is wrapped around the edge of the stack. The leading edge and the trailing edge of the membrane are bonded together where they meet, preferably by melt bonding. The membrane may be sealed to the membrane or endplate on the outside surface of the monopolar plates, where present. Where a case is used, the assembly may be inserted into case. Preferably the membrane functions as a case. In the melt bonding embodiment, the membrane and edge of the stack are exposed to a temperature or condition at which the surface of each is melted, becomes molten, for a time sufficient to melt the surface of each. The temperature chosen is preferably above the melting temperature of the material used in the membrane and/or the substrate and any other structural components. Preferably the temperature used is about 200° C. or greater, more preferably about 220° C. or greater and most preferably about 230° C. or greater. Preferably the temperature used is about 300° C. or less, more preferably about 270° C. or less and most preferably about 240° C. or less.

Illustrative Embodiments

The following descriptions of the Figures are provided to illustrate the teachings herein but are not intended to limit the scope thereof. One or more features illustrated in one figure may be combined with one or more features of another figure.

FIG. 1 illustrates a battery plate 10. The battery plate 10 includes a substrate 11. The substrate 11 includes inserts 41 projecting therefrom. The inserts 41 include openings 40 passing therethrough. The inserts 41 extend through voids 128a,b in a transfer sheet 103 and one or more active materials 105. Located between the transfer sheet 103 and the substrate 11 is one or more active materials 105. The one or more active materials 105 are divided into a first discrete active region 105a and a second discrete active region 105b. The first discrete active region 105a may include a tetrabasic lead while the second discrete active region 105b may include a tribasic lead. The one or more active materials 105 may be in the form of a paste. The first discrete active region 105a and the second discrete active region 105b are both disposed on the substrate 11. The first discrete active region 105a and the second discrete active region 105b are adjacent to one another. The first discrete active region 105a and the second discrete active region 105b are free from overlapping with one another. The first discrete region 105a is substantially symmetrical P relative to the second discrete active region 105b.

Figure 2:
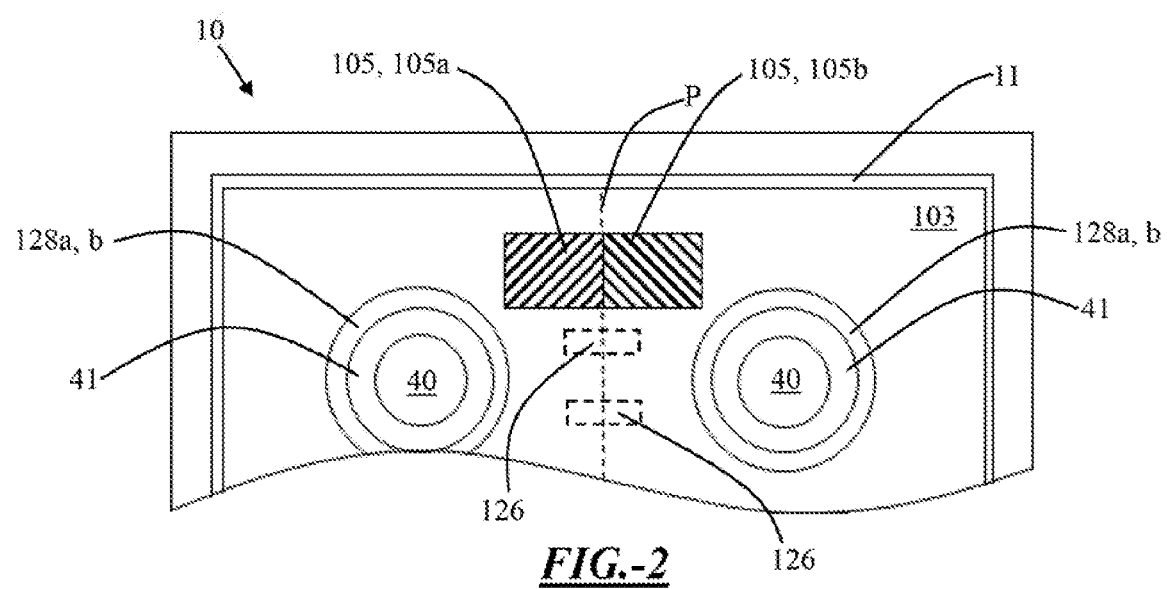
FIG. 2 illustrates a close-up view of the battery plate of FIG. 1 which is partially cut away.

FIG. 2 illustrates a cut-away view of the battery plate 10 of FIG. 1. The battery plate 10 includes a substrate 11. Disposed on the substrate is one or more active materials 105. The one or more active materials 105 includes a first discrete active region 105a and a second discrete active region 105b. Located on the one or more active materials 105 is a transfer sheet 103. The transfer sheet 103 is cut-away to expose the first discrete active region 105a and the second discrete active region 105b. One or more conductive transmitters 126 may optionally connect the first discrete active region 105a with the second discrete active region 105b. For example, one or more conductive pins may reside and extend over from the first discrete active region 105a to the second discrete active region 105b.

Figure 3:
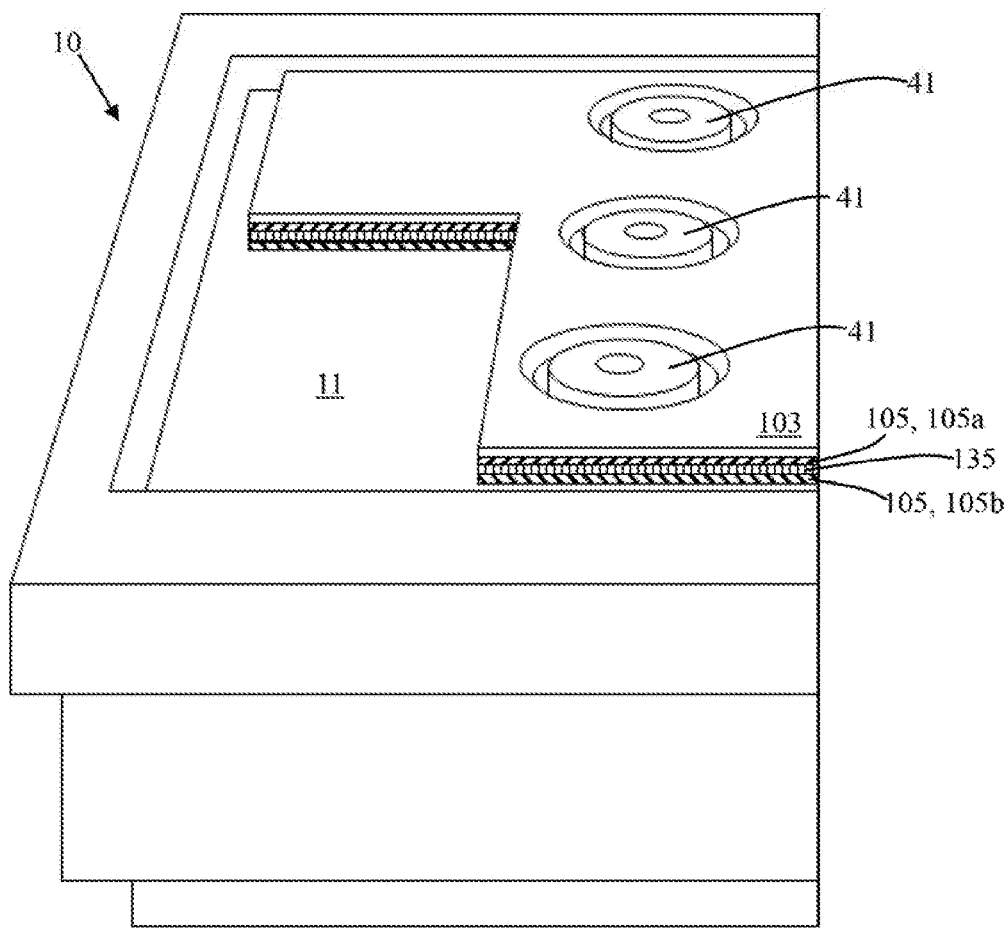
FIG. 3 illustrates a cut-away view of a battery plate.

FIG. 3 illustrates a cut-away view of a battery plate 10. The battery plate 10 includes a substrate 11. Disposed on the substrate 11 is one or more active materials 105. The one or more active materials 105 may be in the form of one or more pastes. The one or more active materials 105 include a first discrete active region 105a and a second discrete active region 105b. Located between the first discrete active region 105a and the second discrete active region 105b is one or more non-active layers 135. The one or more non-active layers 135 may be in the form of an adsorbent glass mat (AGM). As the one more non-active layers 135 is located between the first and second discrete active regions 105a, b the one or more non-active layers 135 are located within (e.g., buried) the one or more active materials 105. The first discrete active region 105a and the second discrete active region 105b are formed in a stack relative to one another and the substrate 11.

Figure 4A:
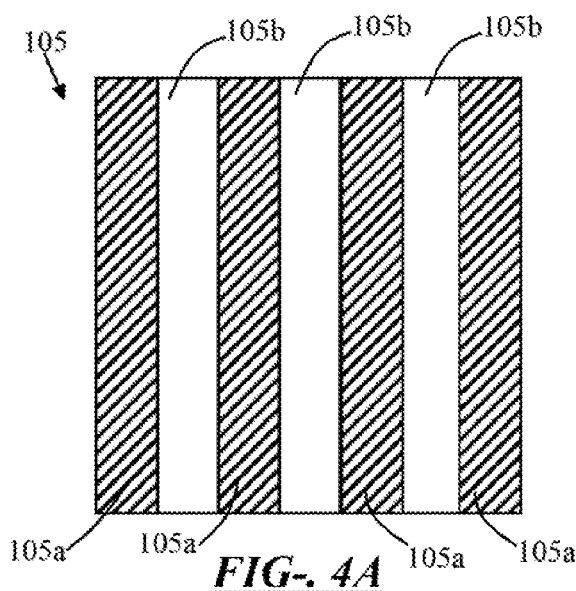
FIG. 4A illustrates adjacent discrete active material regions.
Figure 4B:
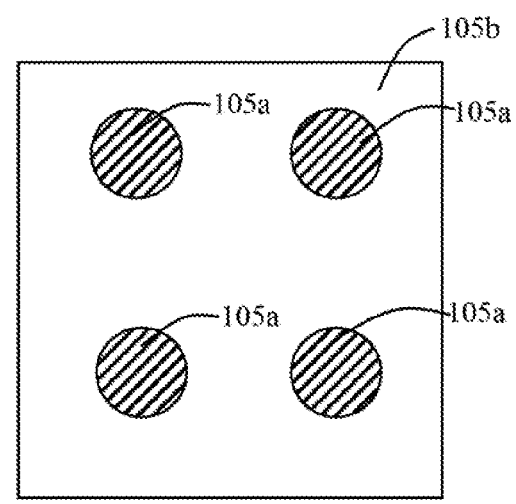
FIG. 4B illustrates enclosed and discrete active material regions.

FIGS. 4A-4F illustrate a cross-section of one or more active materials 105. The cross-sections may be taken along a plan view relatively parallel to a surface of a substrate 11 (not shown) or along an elevation view intersecting (e.g., perpendicular) a surface of the substrate 11 (not shown). The one or more active materials 105 includes a first discrete active region 105a and a second discrete active region 105b. FIG. 4A illustrates the first and second discrete active regions 105a, b as parallel, adjacent, and discrete regions. FIG. 4B illustrates the first discrete active region 105a as a plurality of circular shapes. The first discrete active region 105a is discrete from, surrounded, and enclosed by the second discrete active region 105*b*. FIG. 4C illustrates the first and second discrete active regions 105*a, b* as being adjacent while having differing and asymmetric heights or widths. FIG. 4D illustrates the first and second discrete active regions 105*a, b* uniformly dispersed. As illustrated, the first and second discrete active regions 105*a, b* are formed in substantially similar shaped and offset squares forming a check pattern. In this instance both first and second discrete active regions 105*a, b* have a substantially equal area and volume relative to another. FIG. 4E illustrates the multiple discrete active regions 105*a*, 105*b* being at least partially layered. The first and second discrete active regions 105*a, b* are partially overlapped. The partial overlap is similar to shingles of a roof. This overlap may be compatible when a substrate 11 (not shown) has a non-planar surface area, such as a ribbed or corrugated surface. FIG. 4F illustrates the first and second discrete active layers 105*a, b* in a woven pattern. The discrete active layers 105*a, b* are in the form of strips. The strips are woven so that as one traverses the one or more active materials (not shown), the first and second discrete active regions 105*a, b* alternate between being on the electrode surface (e.g., closer to the substrate 11) to the electrolyte surface (e.g., closer to facing inward to the electrochemical cell).

Figure 5A:
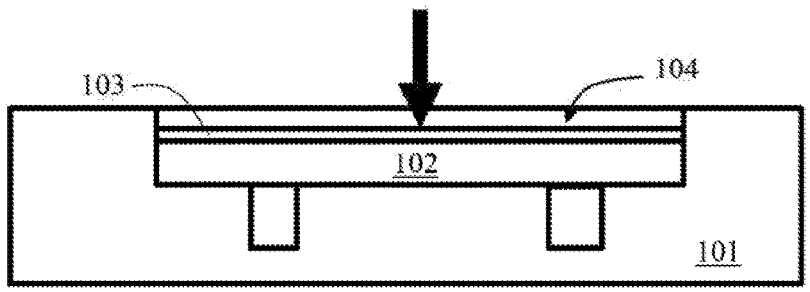
FIG. 5A illustrates a mold with a movable plate.
Figure 5B:
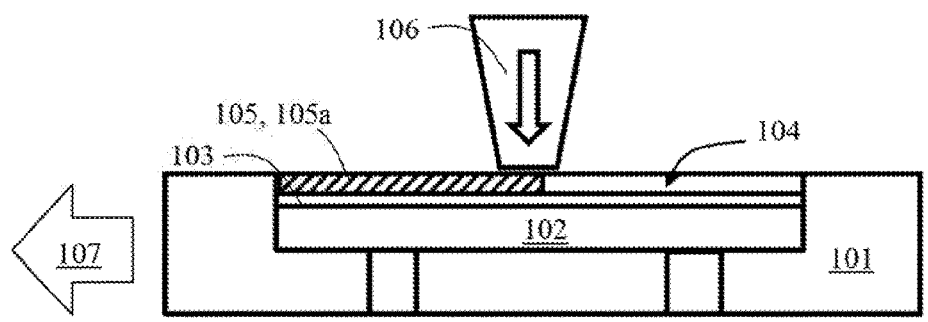
FIG. 5B illustrates application of an active material to a transfer sheet.
Figure 5C:
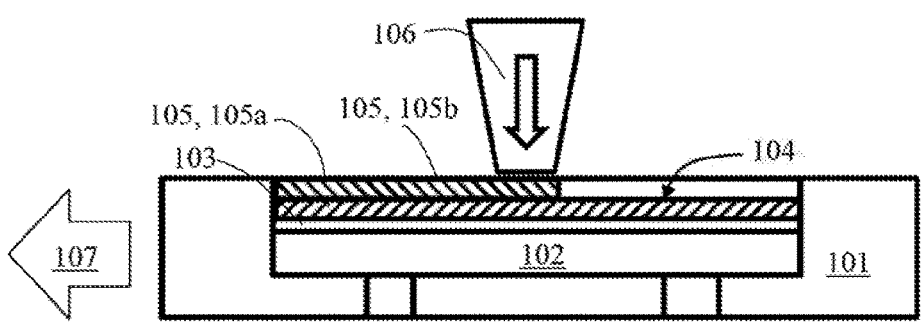
FIG. 5C illustrates application of an active material to another active material.
Figure 5D:
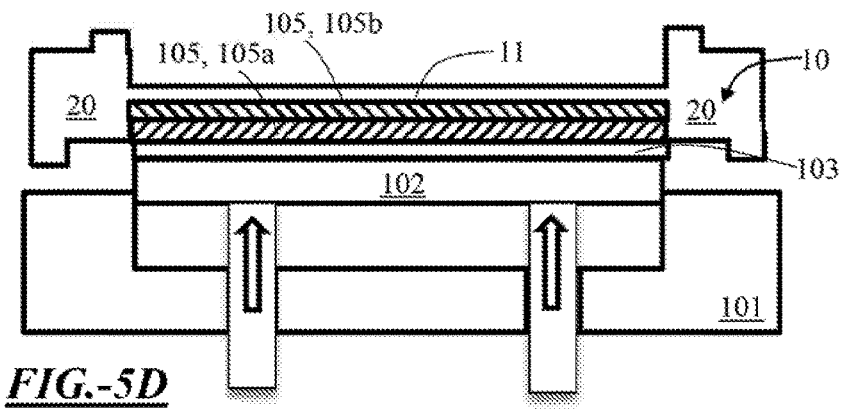
FIG. 5D illustrates application of a transfer sheet and discrete paste regions to a substrate to form a battery plate.

FIGS. 5A-5D show a series of steps using molds 101 with movable plates 102 to form cathodes 13 and anodes 12 to prepare battery plates 10. FIG. 5A shows the mold 101 with a transfer sheet 103 disposed on a movable plate 102. The transfer sheet 103 is located within a mold area 104 of the mold 101. FIG. 5B illustrates the first of one or more active materials 105 being injected into the mold area 104. The first active material 105 is in the form of a paste. The first active material 105 injected into the mold area 104 forms a first discrete active region 105*a*. The first discrete active region 105*a* is injected via an extrusion nozzle 106. The first discrete active region 105*a* is pushed through an orifice under low pressure to fill the mold area 104 as the transfer sheet 103 passes. The direction of the movement of the mold 101 with respect to the extrusion nozzle is shown by arrow 107. FIG. 5C illustrates the movable plate 102 is lowered relative to the mold 101. The second of one or more active materials 105 is injected into the mold area 104. The second active material 105 is also in the form of a paste. The second active material 105 injected into the mold area 104 forms a second discrete active region 105*b*. The second discrete active region 105*b* is layered onto the first discrete active region 105*a*. The second discrete active region 105*b* may be injected by the same or a different extrusion nozzle 106 as the first discrete active region 105*a*. FIG. 5D illustrates the movable plate 102 being extended toward a substrate 11 so the one or more active materials 105 come into contact with the substrate 11. In this instance, it is the second discrete active region 105*b* which comes into contact with the substrate 11. The one or more active materials 105 and transfer sheet 103 may thus become assembled with the substrate 11 to form part of the battery plate 10. The one or more active materials 105 and transfer sheet 103 may be located within a frame 20 of the substrate 11.

Figure 6:
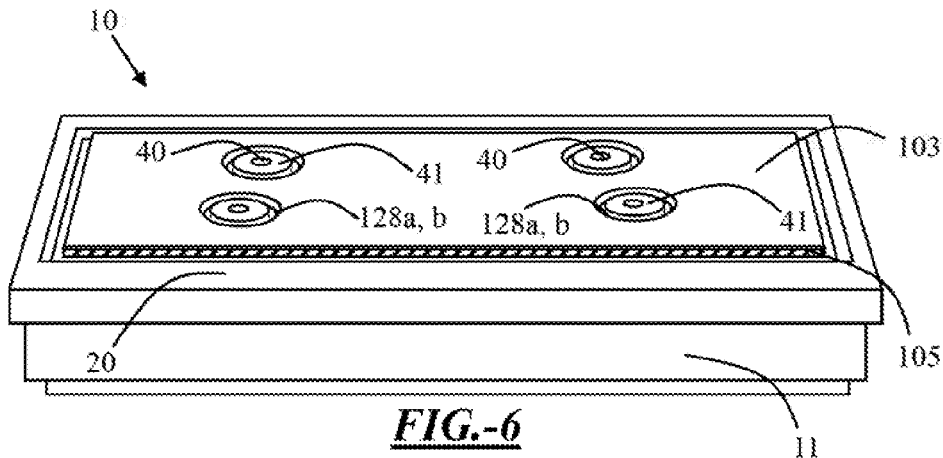
FIG. 6 is a perspective view of a battery plate.
Figure 7:
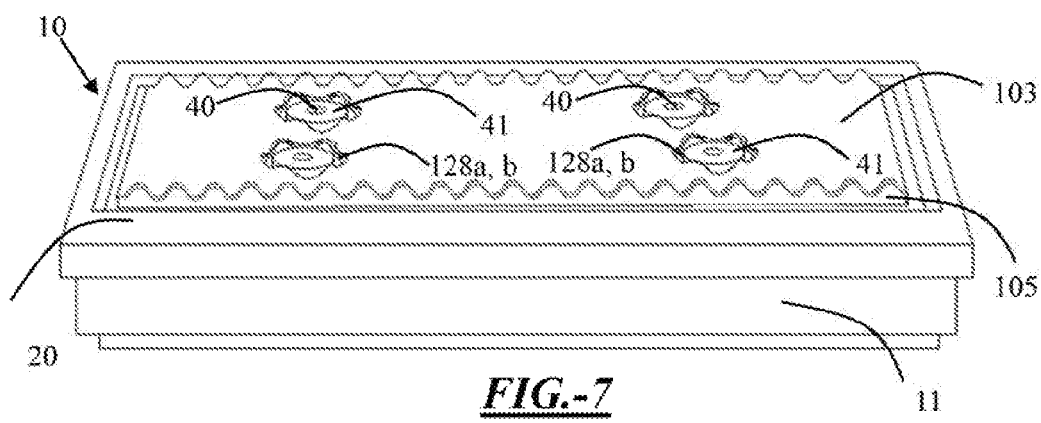
FIG. 7 is a perspective view of a battery plate.

FIGS. 6 and 7 both show a battery plate 10. The battery plate 10 includes a substrate 11. The substrate 11 includes a frame 20 about its periphery. The frame 20 projects from the substrate 11. The substrate 11 includes inserts 41 projecting therefrom. The inserts 41 include openings 40. The inserts 41 project through voids 128*a, b*. The voids 128*a, b* are formed both in the one or more active materials 105 and transfer sheet 103. The inserts 41 project beyond the one or more active materials 105 and the transfer sheet 103. In FIG. 6, the transfer sheet 103 is shown as substantially planar. In FIG. 7, the transfer sheet 103 includes a corrugated surface.

Figure 8:
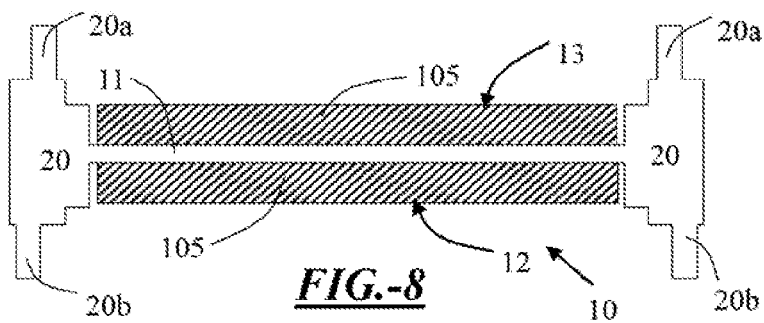
FIG. 8 illustrates a cross-section of a bipolar plate.
Figure 9:
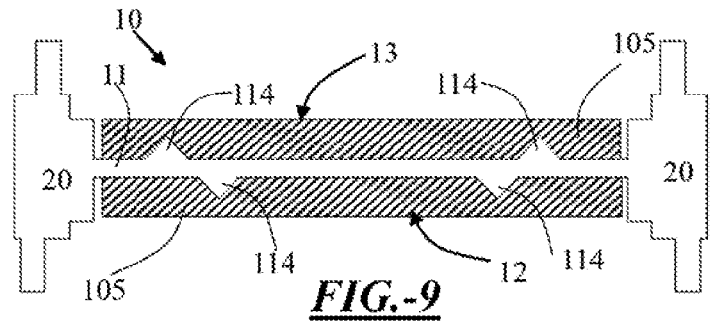
FIG. 9 illustrates a cross-section of a bipolar plate.

FIGS. 8 and 9 both show a battery plate 10 configured as a bipolar plate. The battery plate 10 includes a substrate 11. The substrate 11 includes a frame 20 located at its edges. For example, the frame 20 may go about the periphery of the substrate 11. The frame 20 includes nonplanar features, such as raised edges. The raised edges 20*a,b* extend away from the substrate 11 and the active material 12, 13. The raised edges 20*a,b* may be useful in allowing the battery plate 10 to stack with an adjacent battery plate (not shown). The active material includes a cathode 13 and an anode 12. The cathode 13 and the anode 12 each include one or more active materials 105. In FIG. 9, projections 114 extend from the substrate 11. The projections 114 are located below a surface of the one or more active materials 105.

Figure 10:
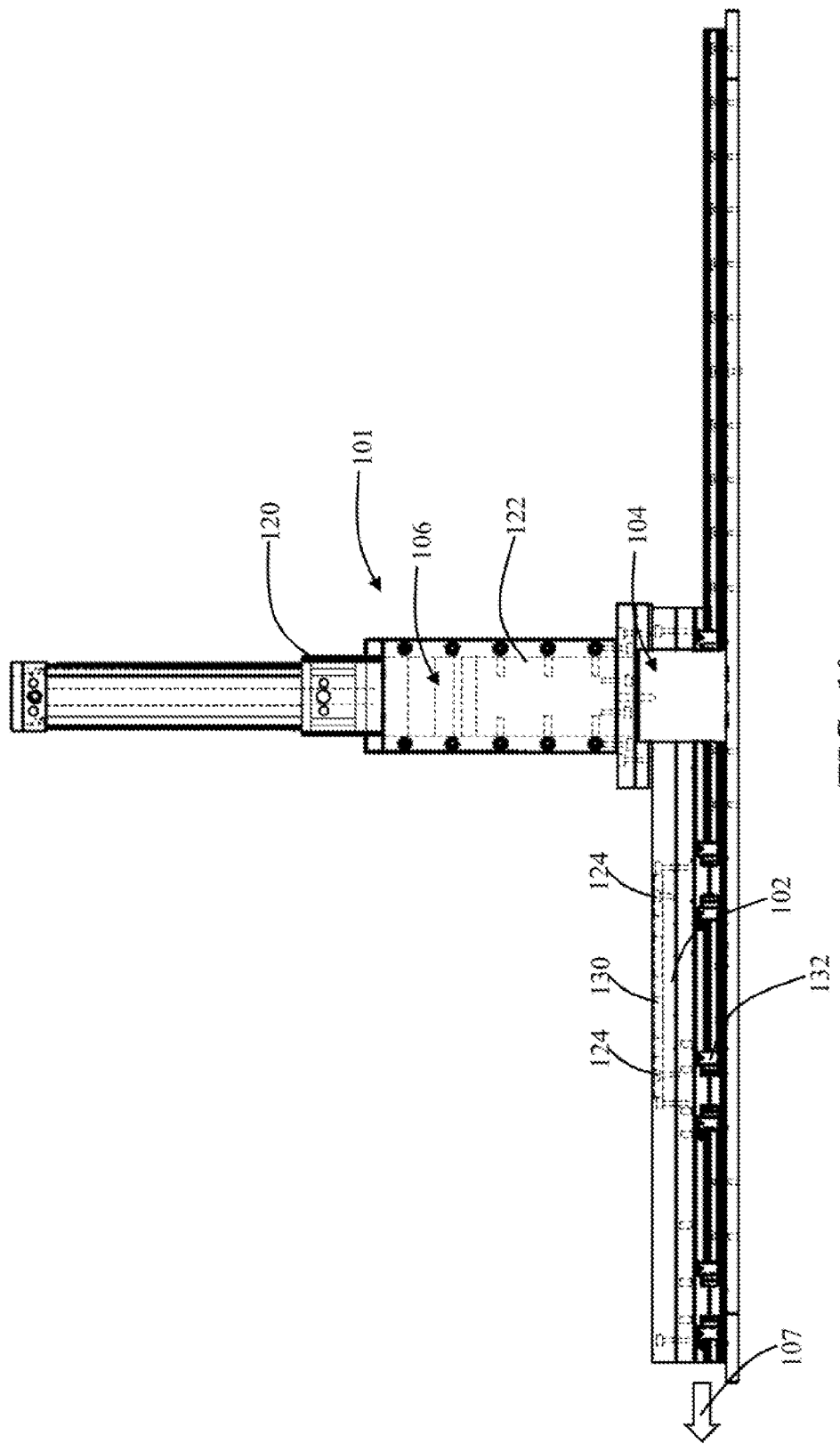
FIG. 10 illustrates a plan view of a mold for transferring paste onto a transfer sheet.

FIG. 10 shows a mold 101 for the application of one or more active materials 105 (not shown) onto a transfer sheet 103 (not shown). A transfer sheet 103 is able to be located in a nest 130 of a movable plate 102 of the mold 101 so as to have the one or more active materials 105 applied thereon. The nest 130 is formed as a depression or cavity within the movable plate 102. The mold 101 includes inserts 124. The inserts 124 are located in the nest 130 such that the inserts 124 project away from the movable plate 102. The inserts 124 may resemble posts projecting within the nest 130. The mold 101 includes an extrusion nozzle 106. The extrusion nozzle 106 includes a ram 120. The ram 120 applies a constant low pressure onto the one or more active materials 105 (not shown) residing within a paste box 122. The one or more active materials 105 may be in the form of one or more pastes. The one or more active materials 105 are pushed through the extrusion nozzle 106 into a mold area 104 so that one or more active materials 105 are applied onto a surface of the transfer sheet 103. As the one or more active materials 105 are applied, the movable plate 102 moves the transfer sheet 103 having the one or more active materials 105 thereon in a direction of movement 107 away from the extrusion nozzle 106. A plurality of conveying elements 132 provide movement of the movable plate 102 in the direction of movement 107.

Figure 11:
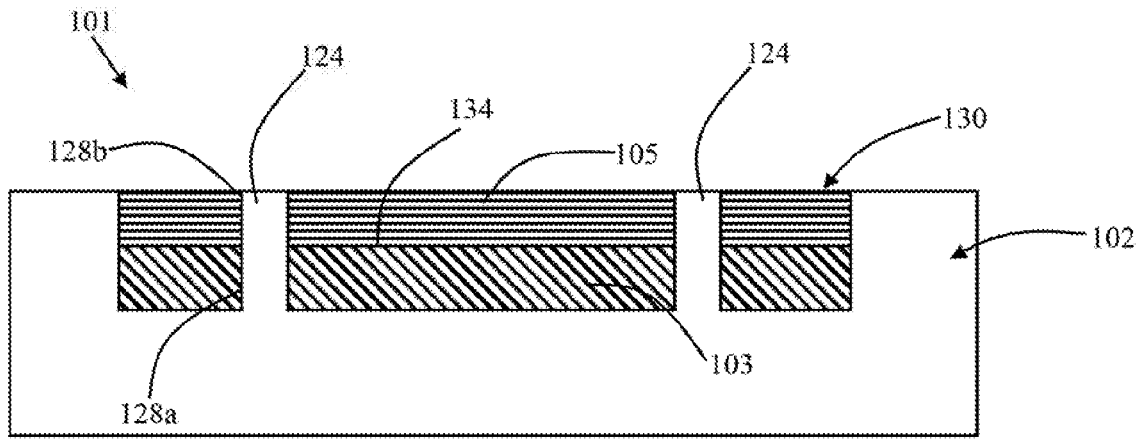
FIG. 11 illustrates a cross-section of a transfer sheet having paste applied thereon located on a movable tray of a mold.

FIG. 11 shows a movable plate 102 of a mold 101 (as shown in FIGS. 5A-D). The movable plate 102 includes a nest 130. Within the nest 130 is a transfer sheet 103. Located on the transfer sheet 103 is one or more active materials 105. For example, after the one or more active materials 105 have been applied to the transfer sheet 103 via an extrusion nozzle 106 (as shown in FIGS. 5A-D). The mold 101 includes inserts 124. The inserts 124 project into the nest 130 and away from the moveable plate 102. The inserts 124 project through openings 128*a* of the transfer sheet 103. The openings 128*a* are formed in the transfer sheet 103 prior to the transfer sheet 103 being placed in the nest 130. The inserts 124 project beyond an upper surface 134 of the transfer sheet 103. When the one or more active materials 105 is applied to the upper surface 134 of the transfer sheet 103, the inserts 124 prevent one or more active materials 105 from filling openings 128*a* and result in openings 128*b* formed within the one or more active materials 105. The openings 128*b* of the one or more active materials 105 are thus aligned with the openings 128*a* of the transfer sheet 103. When the transfer sheet 103 and one or more active materials 105 are assembled to a battery plate 10 (such as shown in FIG. 1, 6, 7, 8 or 9), the openings 128*a, b* may be aligned with other openings to form one or more channels.

Figure 12:
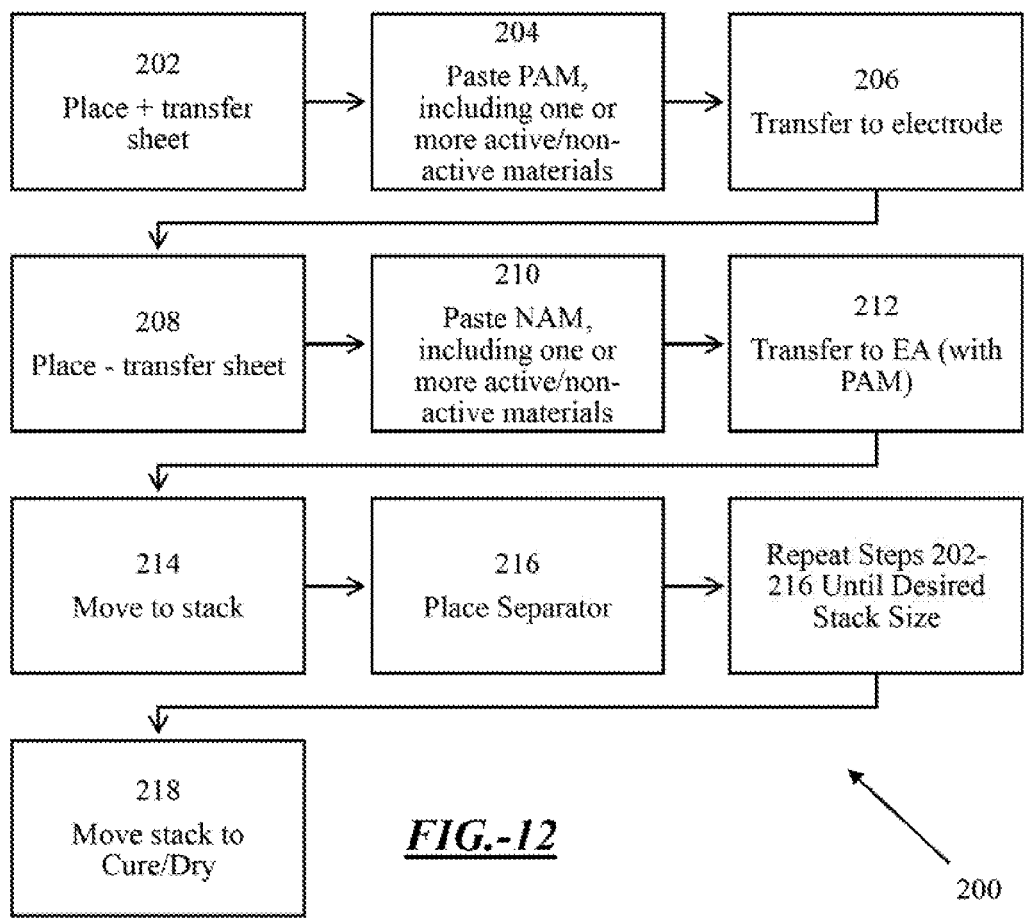
FIG. 12 illustrates a process for preparing a battery plate with a mold.

FIG. 12 illustrates a process 200 for preparing a battery plate 10 with a mold 101, and then assembling within a stack of battery plates 10 to form a battery assembly. The battery plate 10 may be a bipolar plate, although the process would be similar for a monopolar plate or even dual polar plate. The first step 202 includes placing transfer sheet 103 within the mold 101. The transfer sheet 103 may be a positive transfer sheet. The second step 204 includes applying one or more active materials 105, and optionally, one or more non-active layers 135, to the transfer sheet 103. The one or more active materials 105 is a positive active material (PAM). The transfer sheet 103 in combination with the one or more active materials 105 and optionally, one or more non-active material layers 135, which is a positive active material (PAM) form a cathode 13. The third step 206 includes removing the transfer sheet 103 and one or more active materials 105, or cathode 13, from the mold 101 and transferring to a substrate 11. The fourth step 208 includes placing transfer sheet 103 within the mold 101. The transfer sheet 103 may be a negative transfer sheet. The fifth step 210 includes applying one or more active materials 105, and optionally, one or more non-active material layers 135, to the transfer sheet 103. The one or more active materials 105 is a negative active material (NAM). The transfer sheet 103 in combination with the one or more active materials 105, and optionally one or more non-active material layers, which is a negative active material (PAM) form an anode 12. The sixth step 212 includes removing the transfer sheet 103 and one or more active materials 105, or anode 13, from the mold 101 and transferring to the substrate 11. The anode 12 is located on the opposite surface of the substrate 11 as the cathode 13. The first step 202 through the third step 206 can be performed before, after, or in parallel with the fourth step 208 through the sixth step 212. The battery plate 10 is assembled as a bipolar plate once the anode 12 and cathode 13 are located thereon. The seventh step 214 includes transferring and adding the assembled battery plate 10 to a stack of battery plates. The first step 202 through the seventh step 214 may be repeated as many times as desired until a desired stack size is reached. The last step 218 involves curing the stack of assembled battery plates. The stack may need to be moved, such as from an assembly line or station to a curing area.

FIGS. 13 and 14 illustrate a stack of battery plates 10 and separators 14 which form a battery assembly 1. FIG. 13 illustrates a partially exploded view of the stack while FIG. 14 illustrates a perspective view of the stack. Shown is an end plate 25 having a terminal hole 42 and holes 39 for posts 17 in the form of bolts and nuts 19. Adjacent to the end plate 25 is a battery plate 10 which is a monopolar plate 43 having a frame 20 with a raised edge. The monopolar plate 43 has raised inserts 41 that surround holes 40 used to form a transverse channel 16 and post 17 in the holes. Adjacent to the monopolar plate 43 is a separator 14. The separator 14 has a frame 34 about the periphery. The separator 14 includes an adsorbent glass mat 36 comprising the central portion within the frame 34. Molded inserts 35 surrounding molded insert holes 37 for forming the transverse channels 16 are shown. Adjacent to the separator 14 is a bipolar plate 44. The bipolar plate 44 includes a frame 20 about the periphery. The frame 20 is a raised surface. Raised inserts 41 are raised to form the transverse channel 16. The raised inserts 41 form raised insert holes 40 for the transverse channel. FIG. 14 shows the stack of battery plates 10 and separators 14. Shown are end plates 25, battery plate substrate frames 20, separator frames 34, posts 17, and nuts 19 about the posts 17. A terminal hole 42 in the endplate 25 has a battery terminal 33 located therein.

FIG. 15 shows a side view of a stack of battery plates 10 which form a battery assembly 1. The battery plates 10 include monopolar plates 43 at opposing ends of the stack of battery plates 10. In between the opposing monopolar plates 43 is a plurality of bipolar plates 44. Each of the battery plates 10 include a substrate 11. Adjacent to each substrate 11 of the bipolar plates 44 are anodes 12 and cathodes 13. Disposed between each pair of anodes 12 and cathodes 13 is a separator 14. The separator 14 is shown as an absorbent glass mat having a liquid electrolyte absorbed therein. Each pair of anodes 12 and cathodes 13 with the electrolyte therebetween forms an electrochemical cell. Also shown is a transverse channel 16. A channel seal 15 is disposed within the transverse channel 16. The channel seal 15 can be formed by one or more inserts 35, 41 mated together, as a rubber tube, or both. Located inside the channel seal 15 is a post 17. The post 17 is in the form of a threaded bolt. The post 17 can also be a molded post located therein. At the end of the post 17 are overlapping portions 18, 19. The overlapping portions 18, 19 are in the form of a bolt head 18 and nut 19. The overlapping portions 18, 19 can also be molded thereon, such as molded heads. About the edge of the substrates 11 of both the monopolar plates 43 and bipolar plates 44 are frames 20.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps. Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A battery plate comprising:
   a) a substrate having a first surface opposing a second surface, wherein the substrate comprises a non-conductive polymer;
   b) two or more active materials disposed on the first surface or the second surface of the substrate;
      wherein the two or more active materials disposed on the first surface or the second surface form two or more discrete active material regions;
      wherein the two or more discrete active material regions are deposited adjacent to one another in a plane which is parallel to the first surface or the second surface of the substrate;
      wherein at least one of the two or more discrete active material regions includes a first lead oxide;
      wherein at least another of the two or more discrete active material regions includes a second lead oxide different from the first lead oxide;
      wherein the battery plate is free of a grid upon which the two or more active materials are disposed on;
      wherein the two or more discrete active material regions are directly adjacent to one another such that the first lead oxide is adjacent to and in contact with the second lead oxide; and
      wherein the battery plate is a monopolar plate, a bipolar plate, a dual polar plate, or a combination thereof.

2. The battery plate of claim 1, wherein the two or more active materials are in a form of a paste.

3. The battery plate of claim 1, wherein at least one of the two or more discrete active material regions includes a tribasic lead oxide, a tetrabasic lead oxide, or both.

4. The battery plate of claim 1, wherein the first lead oxide includes a tribasic lead oxide and the second lead oxide includes a tetrabasic lead oxide.

5. The battery plate of claim 1, wherein at least one of the two or more discrete active material regions is a high-energy paste while at least another of the two or more discrete active material regions is a high-power paste.

6. The battery plate of claim 1, wherein at least one of the two or more discrete active material regions includes one or more conductive additives.

7. The battery plate of claim 1, wherein the two or more discrete active material regions are substantially symmetric or substantially asymmetric.

8. The battery plate of claim 1, wherein the two or more discrete active material regions are substantially continuous relative to one another.

9. The battery plate of claim 1, wherein the two or more active materials are separated into the two or more discrete active material regions.

10. The battery plate of claim 9, wherein the two or more active materials include one or more active materials having a higher pore surface area than one or more other active materials.

11. The battery plate of claim 9, wherein the two or more active materials include one or more high pore surface area materials which have a pore surface area of about 8 $m^2/g$ or higher to about 20 $m^2/g$ or less.

12. The battery plate of claim 9, wherein the two or more active materials include one or more low pore surface materials which have a porosity of about 0 $m^2/g$ or greater to about 5 $m^2/g$ or less.

13. The battery plate of claim 9, wherein the two or more active materials include one or more active materials including a higher density material than one or more other active materials.

14. The battery plate of claim 9, wherein the two or more active materials include one or more high density materials which have a density of about 3.7 g/cc or greater to about 4.1 g/cc or less.

15. The battery plate of claim 9, wherein the two or more active materials include one or more low density materials which have a density of about 2.6 g/cc or greater to about 2.9 g/cc or less.

16. A battery plate comprising:
   a) a substrate having a first surface opposing a second surface, wherein the substrate comprises a non-conductive polymer;
   b) two or more active materials disposed on the first surface or the second surface of the substrate;
      wherein the two or more active materials are separated into two or more discrete active material regions;
      wherein the two or more discrete active material regions are deposited adjacent to one another in a plane which is parallel to the first surface or the second surface of the substrate;
      wherein at least one of the two or more discrete active material regions includes a first lead oxide;
      wherein at least another of the two or more discrete active material regions includes a second lead oxide different from the first lead oxide;
      wherein the battery plate is free of a grid upon which the two or more active materials are disposed on;
      wherein the battery plate is a monopolar plate, a bipolar plate, a dual polar plate, or a combination thereof;
      wherein the two or more discrete active material regions are substantially continuous relative to one another and form one or more patterns on the first surface or on the second surface of the substrate; and
      wherein the two or more discrete active material regions are directly adjacent to one another such that the first lead oxide is adjacent to and in contact with the second lead oxide.

17. The battery plate of claim 16, wherein the two or more active materials include one or more active materials having a higher pore surface area than one or more other active materials.

18. The battery plate of claim 16, wherein the two or more active materials include one or more high pore surface area materials which have a pore surface area of about 8 $m^2/g$ or higher to about 20 $m^2/g$ or less; and
   wherein the two or more active materials include one or more low pore surface materials which have a porosity of about 0 $m^2/g$ or greater to about 5 $m^2/g$ or less.

19. The battery plate of claim 16, wherein the two or more active materials include one or more active materials including a higher density material than one or more other active materials.

20. The battery plate of claim 16, wherein the two or more active materials include one or more high density materials which have a density of about 3.7 g/cc or greater to about 4.1 g/cc or less; and
   wherein the two or more active materials include one or more low density materials which have a density of about 2.6 g/cc or greater to about 2.9 g/cc or less.

* * * * *